Feb. 4, 1958 R. N. HALL 2,822,308

SEMICONDUCTOR P-N JUNCTION UNITS AND METHOD OF MAKING THE SAME

Filed March 29, 1955 3 Sheets-Sheet 1

Inventor:
Robert N. Hall,
by Paul A. Frank
His Attorney.

Feb. 4, 1958 R. N. HALL 2,822,308

SEMICONDUCTOR P-N JUNCTION UNITS AND METHOD OF MAKING THE SAME

Filed March 29, 1955 3 Sheets-Sheet 2

Inventor:
Robert N. Hall,
by Paul A. Frank
His Attorney.

SEMICONDUCTOR P-N JUNCTION UNITS AND METHOD OF MAKING THE SAME

Filed March 29, 1955 3 Sheets-Sheet 3

Inventor:
Robert N. Hall,
by Paul A. Frank
His Attorney.

United States Patent Office 2,822,308

Patented Feb. 4, 1958

2,822,308

SEMICONDUCTOR P-N JUNCTION UNITS AND METHOD OF MAKING THE SAME

Robert N. Hall, Schenectady, N. Y., assignor to General Electric Company, a corporation of New York Application March 29, 1955, Serial No. 497,510

29 Claims. (Cl. 148—1.5)

My invention relates to semiconductor devices, and more particularly, to semiconductor devices which utilize monocrystalline semiconductor bodies, known as P–N junction units having a first region possessing P-type conductivity characteristics, a second region possessing N-type conductivity characteristics, and an intermediate intrinsic region possessing neither P- nor N-type conductivity characteristics, such region constituting a P-N junction. This application is a continuation-in-part of my copending application Serial No. 383,348, filed September 30, 1953, which is a continuation-in-part of my application Serial No. 304,203, filed August 13, 1952 and now abandoned, both of which applications are assigned to the same assignee as the present invention.

Semiconductors, such as germanium and silicon, are materials which are neither metals nor insulators. As used herein, the term "semiconductor" denotes an element possessing electronic conduction characteristics, that is, in which conductivity is carried on by either an excess or a deficiency of electrons. Semiconductors possess resistivities intermediate between the low resistivity of metals and the high resistivity of insulators. In semiconductors, the electrical charge carrier concentration increases with increases in temperature over a substantial temperature range. Semiconductors have become conventionally classified as either positive (P-type), or negative (N-type), or intrinsic (neither positive nor negative), depending primarily upon the type and sign of their predominant conduciton carriers. In P-type semiconductors, the direction of rectification as well as the polarity of generated voltages such as thermoelectric, photoelectric or Hall effect voltage, are all opposite to that produced with N-type semiconductors. According to prevailing theory, conduction in N-type materials is carried on by electrons and is due to the free movement thereof through the crystal lattice; while conduction in P-type materials is primarily by means of the movement of electron vacancies or "positive holes."

It has been found that the determinant of whether a particular semiconductor body exhibits N- or P-type characteristics lies primarily in the type of impurity elements present in the semiconductor.

Some impurity elements called "donors" usually having a higher degree of combining power, that is, valence, than the semiconductor, function to furnish additional free electrons to the semiconductor so as to produce an electronic excess and consequently an N-type semiconductor. Other impurity elements, called "acceptors," having a lower valence than the semiconductor, function to absorb electrons from the semiconductor crystal lattice to create a P-type semiconductor with deficiency of electrons, or an excess of "positive holes." An intrinsic semiconductor which is a semiconductor that exhibits neither P-type nor N-type characteristics may result from either a complete freedom of impurities or an electrical balance between conduction carriers produced by the proper proportions of both acceptor and donor impurities in the semiconductor. Antimony, phosphorus, and arsenic, falling in group V of the periodic table, are examples of "donor" impurities for germanium and silicon, while boron, aluminum, gallium and indium, falling in group III of the periodic table, are examples of acceptor impurities for germanium and silicon. Only minute traces of these impurities, less than 1 part per million, are sufficient to produce marked electrical characteristics of one type or another.

It has been known for some time that if a semiconductor body is produced having a P-type region adjoining an N-type region to form a thin intrinsic semiconductor junction region or layer, the resulting "P-N junction unit" possesses remarkable rectifying, thermoelectric, and photoelectric properties. A current may be passed easily in only one direction through such units, and a potential difference may be generated between the P- and N-type regions by concentrating heat or light upon the junction region.

More recently, it has been found that a semiconductor body having a region of one conductivity type adjoining two regions of opposite conductivity type to form two intrinsic P-N junction regions can be used in a three terminal device known as a "transistor" to provide current, voltage, and power amplification. These amplifying semiconductor bodies have become known as P-N-P or N-P-N junction units in accord with the distribution of their P-type and N-type regions. The three terminal semiconductor devices utilizing such double junction units have become known as "large area" or "P-N junction type" transistors in order to distinguish them from transistors in which two small area rectifying regions provided by point-contacting electrodes serve the purpose of such P-N junction regions.

The optimum back-to-forward resistance ratio, capacitance, peak inverse voltage rating, and other electrical characteristics desired for each P-N junction region of such single or multiple junction units depends upon their destined use and varies to a considerable extent between units destined for different purposes. Because of the extreme and unusual sensitivity of the electrical characteristics of crystalline semiconductors to the presence of minute traces of impurities and because of the deleterious effect of crystal boundaries or minor lattice distortions upon the electrical properties of the P-N junction region, it has heretofore been virtually impossible intentionally and predictably to reproduce P-N junction units having predetermined optimum electrical characteristics desired for certain destined uses. In particular, it has been heretofore virtually impossible to provide a P-N junction type transistor having the optimum electrical characteristics at each junction for use as a high frequency amplifier. In such transistors, one P-N junction, known as the "collector" junction, through which output current passes should preferably have a gradual variation across the junction from high impurity content of one type, such as donors, to high impurity content of opposite type, such as acceptors, to provide a wide gradual rectifying barrier, with high impedance, high breakdown potential and low capacitance. The other P-N junction, known as the "emitter" junction, should preferably have an abrupt variation across the junction from high impurity content of one type to low impurity content of the opposite type to provide a narrow, steep rectifying barrier with low impedance in the forward direction of current flow and a high ratio of conduction carriers of one type to conduction carriers of the opposite type during current flow in this forward or easy direction across this emitter junction. Moreover, for high gain, high frequency applications, the region of one conductivity type between and adjoining the two opposite conductivity type regions should, in order to reduce "transit time" effects, preferably be only a very thin layer of material less than 0.001 inch thick.

One method currently employed in an attempt to make P-N junction units having predictable desired characteristics is to grow a semiconductor monocrystal from a substantially pure semiconductor melt at a very slow constant rate of growth, usually less than 1 inch per hour, and to add to the melt small traces of donor and acceptor impurities in slow succession, thereby to convert the growing ingot from one type semi-conductor to the other. This crystal growing method has the advantage that lattice strains and distortions are minimized in the resultant monocrystalline material. Many difficulties arise, however, in actually practicing this method. In order to avoid irregularities, the crystal must be grown slowly and sufficient time must be allotted between impurity additions for each impurity to be thoroughly mixed into the melt and picked up by the growing ingot before the next impurity is added. This also makes it very difficult to produce in multiple junction units a very thin layer of one conductivity material less, for example, than 0.001 inch thick. The second impurity must be added in sufficient amount to overbalance the opposite sign conduction carrier inducing effect of the first impurity. For double junction units, a third impurity addition must be made in sufficient amount to overcome the opposite-sign-conduction carrier inducing effect of the second impurity. The impurity content and gradients produced in the first junction thus limit the impurity content and gradients which may be produced in successive junctions. If, for example, high impurity content is desired on one side of an emitter junction of a transistor, the collector junction must be formed first, and the impurity content on both sides of this collector junction must be kept at a lower than optimum value. Because of the continually increasing impurity content in the melt, only one or two high quality P-N junctions can normally be produced in a single ingot grown by this method. The excess impurity-impregnated melt from which the crystal is grown must somehow be repurified before it can again be used. Moreover, highly exacting laboratory techniques must be employed in order to maintain an absolutely constant temperature of the melt and to provide adequate stirring to distribute the added impurities uniformly at the very slowly growing crystal interface.

Accordingly, an important object of the invention is to provide a new and versatile method for producing, with excellent control and reliability, P-N junction semiconductor units having practically any desired combination of electrical characteristics at the junction region.

A further object is to provide a crystal growing method for producing P-N junction units which retains the advantages but eliminates many of the disadvantages and difficulties encountered in prior crystal growing methods of making P-N junction units.

In furtherance of this latter object, one specific object is to provide a crystal growing method for producing P-N junctions in which the crystal is grown at a faster rate than could be employed with such prior crystal growing methods and which thus may be grown in shorter time, without absolutely constant temperature control of the melt and without great difficulty in providing adequate stirring. A second specific object is to provide a new crystal growing method for producing a great number, for example, 100, high quality P-N junctions in a single grown ingot. This is possible with my new method since there are no successive impurity additions producing a build-up of impurity concentration in the melt. A third specific object is to provide a crystal growing method in which the remaining melt from which the crystal is grown may be used over and over again without repurification to grow additional high quality P-N junction containing ingots.

Another object is to provide P-N junction rectifiers and transistors having improved electrical characteristics for use in high frequency electrical circuits and a new method of making such improved high frequency P-N junction rectifiers and transistors.

In furtherance of this latter object, other specific objects of the invention are to provide improved P-N junction units having unusually low capacitance and improved N-P-N junction units having substantially optimum emitter junction characteristics, substantially optimum collector junction characteristics, and a very thin P-type region less than 0.001 inch thick; and to methods of making such improved P-N and N-P-N junction units.

In accord with my invention, I have found that the extent to which certain donor and acceptor impurities present in a semiconductor melt are picked up or assimilated by an ingot grown from the melt varies with the rate of crystal growth. The ratio of impurity content assimilated by a growing ingot to the impurity content in the liquid semiconductor in contact with the growing ingot is called the segregation coefficient, and I have also found that the degree of variation in segregation coefficient shown by certain impurities over a given range of variation in crystal growth rate differs substantially from that of certain other impurities. In practicing my new method of making P-N junction units, a melt is prepared consisting of the semiconductor such as germanium or silicon, a trace of a donor impurity for the semiconductor, such as arsenic, antimony or phosphorus, and a trace of an acceptor impurity for the semiconductor such as boron, indium, gallium or aluminum. The word "trace" is herein employed to connote the presence of the designated impurities in amounts less than 0.25%, by weight, of the semiconductor material involved. The impurity traces are included in the melt in effective equivalent amounts properly selected to induce opposite type conduction carriers having equal electrical effect and thus to produce intrinsic type semiconductor in a crystal grown from the melt at a predetermined growth rate. Moreover, the selected donor and acceptor impurities are those having different rates of segregation coefficient variation over a range of crystal growth rate variation encompassing the above-mentioned predetermined growth rate at which intrinsic semiconductor is formed. A monocrystalline ingot is then grown conveniently at a constant withdrawal rate from this melt at growth rates successively varying above and below this intrinsic semiconductor forming growth rate. At a growth rate above the intrinsic semiconductor forming growth rate, one impurity element, such as the donor, is assimilated in excess by the growing ingot to produce N-type conductivity semiconductor material, while at a growth rate below the intrinsic semiconductor forming growth rate, the other impurity element, such as the acceptor, is assimilated in excess to produce P-type conductivity material.

The impurity gradient bordering and across the intermediate intrinsic semiconductor P-N junction region may be easily and accurately controlled by adjusting the incremental growth rate variation as it passes through the intrinsic semiconductor forming growth rate. The amount of conduction carriers in each conductivity type region can be easily and accurately controlled by the absolute amounts of donor and acceptor impurity traces added to the melt, and the ratio of negative to positive conduction carriers can be controlled by the ratio of donor and acceptor impurities in the melt which, in turn, determines the growth rate at which intrinsic semiconductor is formed.

The variation of crystal growth rate utilized in the invention is conveniently conducted at a substantially constant rate of withdrawal. The growth rate variation is actually a variation in the rate at which atomic layers of semiconductor material are deposited consecutively one upon another along the length of the growing monocrystalline ingot as it is withdrawn vertically from a liquid melt. This rate of deposition is a function of the temperature gradient across the crystal-liquid interface, which in turn depends upon the temperature of the melt in the vicinity of the growing crystal and the rate of heat transfer through the grown crystal. Conveniently, in accord with the invention, the crystal growth rate is varied by varying the power input to the melt. Thus, at high power input the temperature of the melt in the vicinity of the growing crystal rises, the temperature gradient across the solid-liquid interface increases and the rate of crystal growth decreases. Conversely, when the power input to the melt is lowered, the mean temperature of the melt in the vicinity of the liquid solid interface decreases, the temperature gradient across the interface decreases and the rate of crystal growth increases. In practicing the invention with semiconductors such as germanium and silicon, the crystal growth rate may be varied in the above-described manner, between 0 and 20 inches per hour.

In accord with another feature of the invention, an ingot containing a plurality of multiple P-N junction units suitable for use in high frequency transistors is grown by successively varying the rate of growth of a crystalline semiconductor ingot above and below the growth rate at which intrinsic semiconductor is formed, and, in addition, during a portion of the cycle the rate of growth is decreased below the zero growth rate to an extent sufficient to melt back a portion of the previously grown ingot. In this manner, very thin layers of one type semiconductor material are produced between two larger regions of opposite type semiconductor material and are joined to these regions by respective emitter and collector P-N junctions having substantially optimum characteristics for use in high gain and high frequency transistors.

The novel features which are believed characteristic of the invention are set forth in the appended claims. The invention itself, however, together with further objects and advantages thereof may best be understood by reference to the following description taken in connection with the accompanying drawings, in which:

Figure 5:
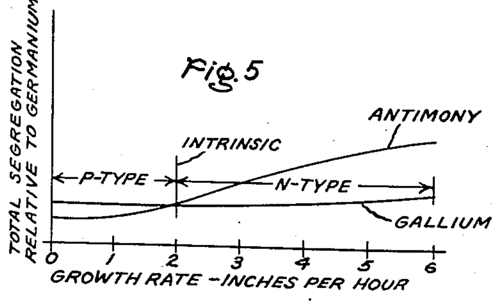
Figure 6:
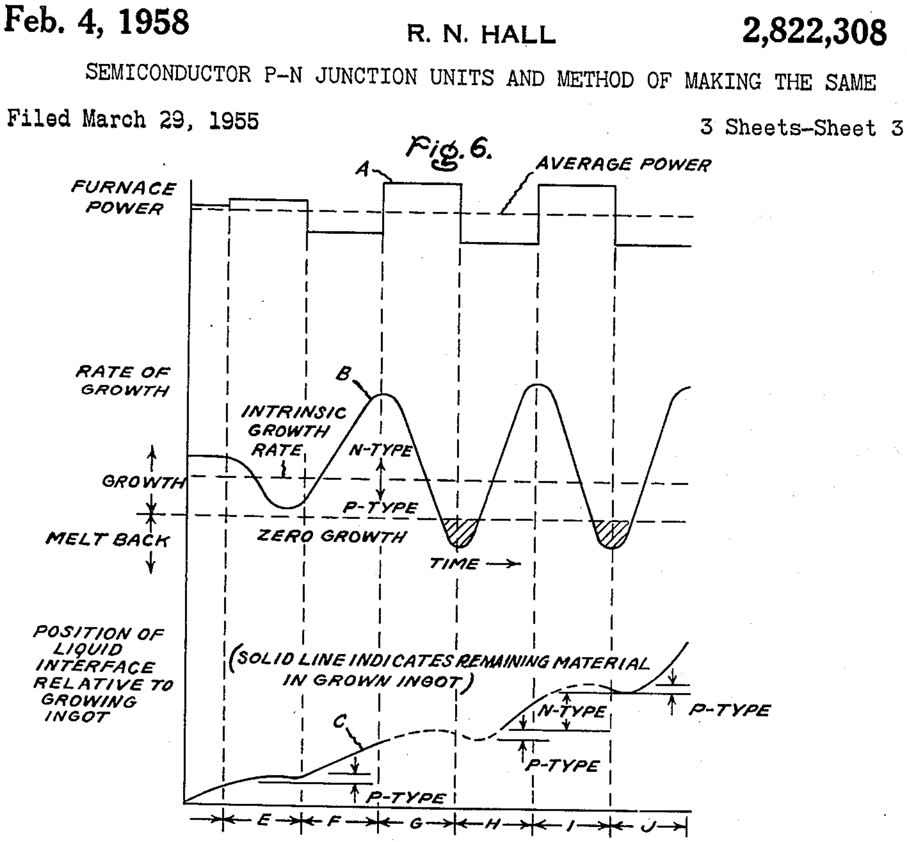
Figure 7:
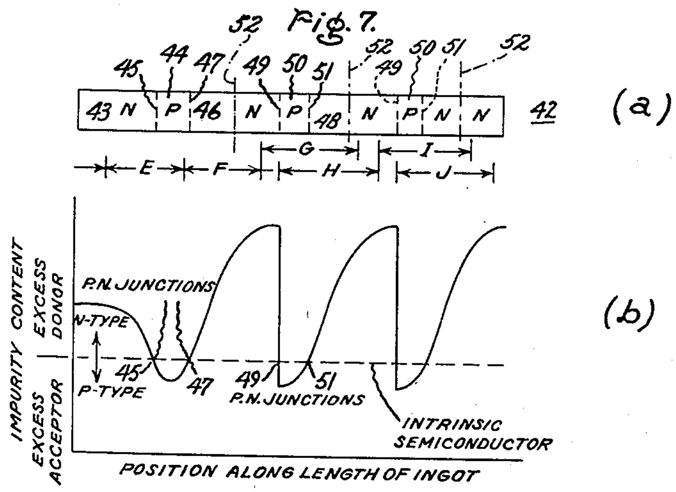
Figure 8:
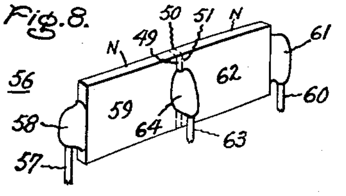

Fig. 5 contains a pair of total segregation versus growth rate curves relative to germanium of a selected donor impurity and a selected acceptor impurity and illustrates the effect of growth rate variation upon the conductivity type of a semiconductor ingot grown from a melt containing these impurities in proper proportion;

Fig. 6 is a group of curves showing the relationship and manner of variation with time of furnace power, rate of ingot growth, and position of liquid-solid interface relative to the growing ingot during a particular growth rate variation cycle preferred for the production of high frequency, high gain transistor N-P-N junction units;

Fig. 7 is a curve showing the impurity content along the length of an ingot grown in accord with the growth rate variation pattern of Fig. 6 together with a diagrammatic representation of the resulting conductivity type material along the length of the grown ingot;

Fig. 8 illustrates an improved high frequency transistor incorporating an N-P-N junction unit produced in accord with my new method.

Figure 1:
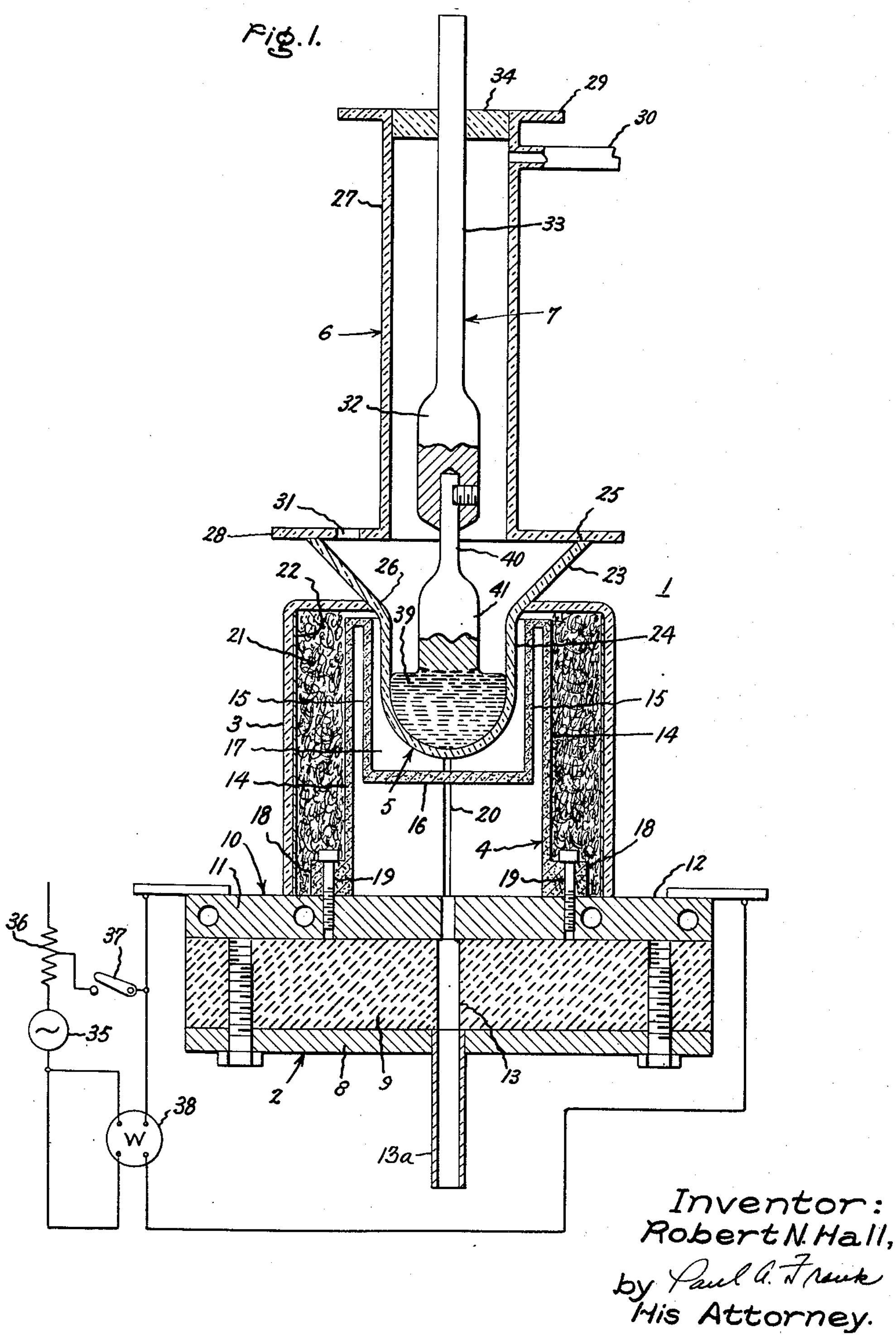
Fig. 1 is a vertical cross-sectional view of a portion of the apparatus preferably employed in practicing the invention.
Figure 2:
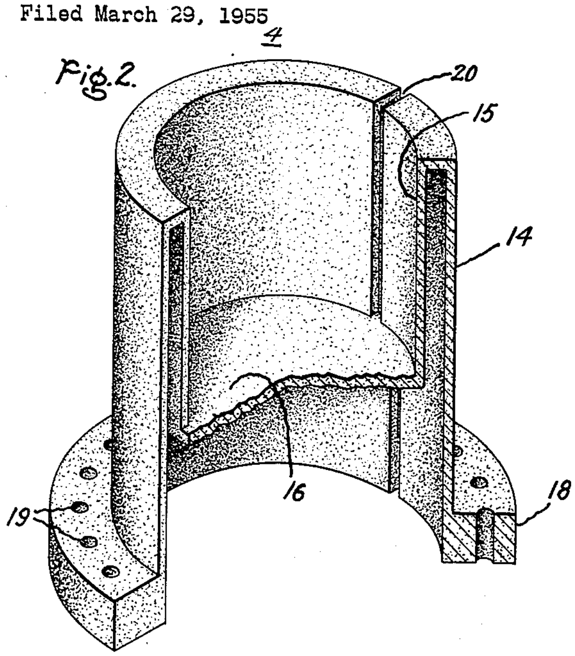
Fig. 2 is a sectional view of the heater element used in the apparatus of Fig. 1.

In Fig. 1 there is shown a typical apparatus in which the preparation of semiconductor bodies according to the invention may be practiced. The apparatus of Fig. 1 represents in vertical cross-section a seed crystal withdrawal type crystal growing furnace represented generally as 1. Furnace 1 includes a base assembly 2, a radiation shield 3, a graphite heating element 4 located within radiation shield 3, a quartz crucible 5 resting upon and within radiation shield 2, and partially surrounded by heating element 4, and a transparent quartz chimney 6 resting upon and forming a gas-tight seal with crucible 5. Seed crystal holding assembly 7 is vertically and rotatably movable within transparent chimney 6. Base assembly 2 of furnace assembly 1 comprises a first brass base plate 8, ¼ inch thick and 6 inches in length and width, a block of refractory insulating material 9, 1 inch thick and 6 inches in length and width and a second brass base plate 10, ½ inch thick and 6 inches in length and width. Second brass base plate 10 is cut in two from front to back forming two separate electrically insulated members 11 and 12 which serve as input and output terminals for the furnace. A passage 13 of ¼ inch diameter is drilled through insulating refractory block 9 and first brass base plate 8 to allow for a non-oxidizing atmosphere such as nitrogen, hydrogen, or argon to be piped into the furnace area through inlet pipe **13*a*. Graphite heater element 4** is shown with greater particularity in the cutout of Fig. 2 of the drawing.

Heater 4 is of $1/16$ inch thick graphite and comprises a reentrant cylinder having an outside cylindrical member 14, 3 inches in length. The diameter of cylindrical member 14 is 2¼ inches. The reentrant portion 15 of heater element 4 extends 1¾ inches within the external cylinder 14 and has an outside diameter of 1⅞ inches. The reentrant portion 15 is terminated at its interior end with a flat end piece 16 forming therewith a heating zone 17 of the furnace into which the lower end of crucible 5 is suspended in the operation of the furnace. The nonreentrant end of graphite heater 4 is terminated with a ½ inch square cross-section annular flange 18 having therein a plurality of cylindrical holes 19 for mounting the heater in good electrical contact with brass base plate 10. The entire heater assembly with the exception of the terminating portion of the reentrant cylindrical member is bifurcated by a $1/16$ inch incision 20 thus allowing a path of current only through the terminating portion of the reentrant member. The heater element is mounted with the bifurcating incision substantially aligned with the cleavage in brass base plate 10 so that a path of current passing through one portion 11 of base plate 10 into the reentrant cylindrical heater element and thus through the other portion 12 of brass base plate 10 is established.

Radiation shield 3 comprises a closed cylindrical member 3½ inches in diameter having a cap member with a tapered orifice in axial symmetry with the reentrant cylindrical heating element 4. The annular region between the exterior of reentrant cylindrical heating element 4 and the interior of radiation shield 3 is filled with loosely-packed quartz wool 21, and the interior surface of radiation shield 3 is coated with a 10 mil thick platinum foil 22. Crucible 5 comprises a ⅛ inch thick quartz body including an inverted frusto-conical section 23, ¾ inch deep, and a cylindrical section 24, 1½ inch deep, terminating in a spherical end. The outside diameter of the larger base 25 of the frustro-conical section is 3¼ inches, and the diameter of the smaller base 26 of the frustro-conical section, of the cylindrical section 24 of the crucible, and of the spherical end thereof is 1½ inches. Crucible 5 rests upon radiation shield 3 with the cylindrical portion thereof suspended within the heating zone 17 defined by the reentrant portion 15 of graphite heater element 4. The spherical end of crucible 5 is suspended ⅛ inch from the terminating end 16 of reentrant cylindrical portion of graphite heating element 4 and the cylindrical sides of the crucible are disposed ⅛ inch from the reentrant portion 15 of graphite heater 4, Transparent chimney 6 comprises a quartz cylinder 27 having ⅛ inch thick walls and an outside diameter of 1 inch. The lower end of chimney 6 has a 4 inch diameter flange 28 which rests upon the larger base 25 of frustro-conical section 22 of crucible 5 forming therewith a substantially gas-tight seal. The upper end of the 6 inch long chimney terminates in a 2 inch diameter flange 29. A protective atmosphere is maintained within crucible 5 by means of gas inlet pipe 30. Excess gas may pass from the crucible through a ⅜ inch diameter hole 31 in flange 28.

Seed crystal holding assembly 7 comprises a stainless steel chuck 32 and a shaft 33 therefor. Chuck shaft 33 passes through a substantially gas-tight seal 34 within the upper end of quartz chimney 6 and is geared to a driving mechanism (not shown) which imparts both rotational and longitudinal motion thereto. Power to operate the furnace is supplied by an alternating current source 35 and may be adjusted by potentiometer 36. Off-on switch 37 is operated to control the heating cycle, and the power input to the furnace is indicated by watt meter 38.

To practice the invention, particles of high purity semiconductor such as germanium or silicon having a purity corresponding to a resistivity above 2 ohm-centimeters are etched with acid to remove surface impurities and are placed within crucible 5 together with the desired weighted amounts of a donor impurity such as antimony, arsenic or phosphorus and an acceptor alloy such as gallium, indium, or aluminum. As used herein the term "high purity semiconductor" is used to connote crystalline semiconductor material having less than a total of less than $10^{-15}$ impurity atoms per cubic centimeter thereof, or in other words, less than one part impurity in $10^7$. Sufficient power is supplied to the furnace heater to melt the semiconductor and impurities. The amount of power necessary will vary from furnace to furnace, but the furnace described hereinbefore requires approximately 1440 watts to melt 100 grams of germanium in from 10 to 15 minutes and approximately 2800 watts to melt 20 grams of silicon in from 10 to 15 minutes. Once the semiconductor has been melted the average power input is reduced until the surface of the melt is only slightly above the melting point of the semiconductor (941° C. for germanium and 1430° C. for silicon). While this value of input power will vary from furnace to furnace, with the apparatus described hereinbefore, furnace power may be reduced to 1000 watts to keep germanium molten, and to 2300 watts to keep silicon molten. The furnace volume above the surface of the melt is continually flushed with an inert or other non-reactive gas to prevent contamination of the melt. A small body, or seed crystal 40, of high purity monocrystalline semiconductor as for example monocrystalline germanium having a purity corresponding to a resistivity above 2 ohm-centimeters is clamped within chuck 32, with a portion exposed, and is lowered until the exposed end thereof is immersed beneath the surface of melt 39. Chuck 32 and seed crystal 40 are preferably axially rotated at a constant speed above 20 revolutions per minute, for example, about 100 revolutions per minute, in order to stir the melt at a rate sufficient to insure a constant and uniform concentration of both acceptor and donor impurities at the liquid-solid interface, although P-N junction units can be made without such stirring. When seed crystal 40 is immersed into melt 39 the heater input power is adjusted so that a monocrystalline semiconductor ingot 41 grows at the preselected desired rate upon seed crystal 40. If the heater power is too high, the seed crystal will melt back; if the heater power is too low, the seed crystal will grow rapidly down into the melt.

When the crystal is slowly growing, the chuck assembly is caused to start withdrawing at a rate preselected as the average rate of crystal growth. The average rate of crystal growth is a function of the temperature gradient across the liquid-solid interface, which is, in turn, controlled by furnace power input. Higher average rates of crystal growth are attained by using lower values of furnace power and vice versa.

Once the crystal has started to grow at a pre-selected average rate, further adjustments in furnace power may be made to maintain a constant ingot diameter, which may be conveniently be ½ inch. The crystal is then being grown at a constant rate of withdrawal and a constant growth rate.

The average growth may conveniently be about 3 inches per hour. As is well known, the growth rate of a crystal is 3 inches per hour when, with a constant elevation of the seed crystal of 3 inches per hour, sufficient heat is supplied to the melt that the diameter of the growing crystal neither increases nor decreases and the position of the liquid-solid interface remains substantially constant.

Figure 3:
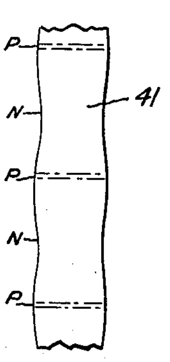
Fig. 3 is an enlarged view of a portion of an ingot grown in accord with the invention with the apparatus of Fig. 1.

In accord with the present invention, ingot 41 is not continually grown at a constant rate as described, but rather is grown at rates varying in accord with a predetermined pattern or cycle. This variation in growth rate is achieved by merely varying the duration and/or amplitude of electrical power supplied to heating element 4, thereby varying the temperature gradient across the growing liquid-to-solid interface. I have discovered that, under a suitable cycle or pattern of growth rate variation and with a proper selection of the type and amount of impurities included in melt 39, the growing ingot can be converted from N-type to P-type semiconductor material and then back from P-type to N-type semiconductor material with intermediate P–N junctions to produce a multitude of P–N junction units along the length of the grown ingot. A typical pattern of N- and P-type semiconductor distribution which may be achieved by the present invention is illustrated in Fig. 3. This particular distribution of conductivity zones is highly desirable for N–P–N type transistors.

Figure 4:
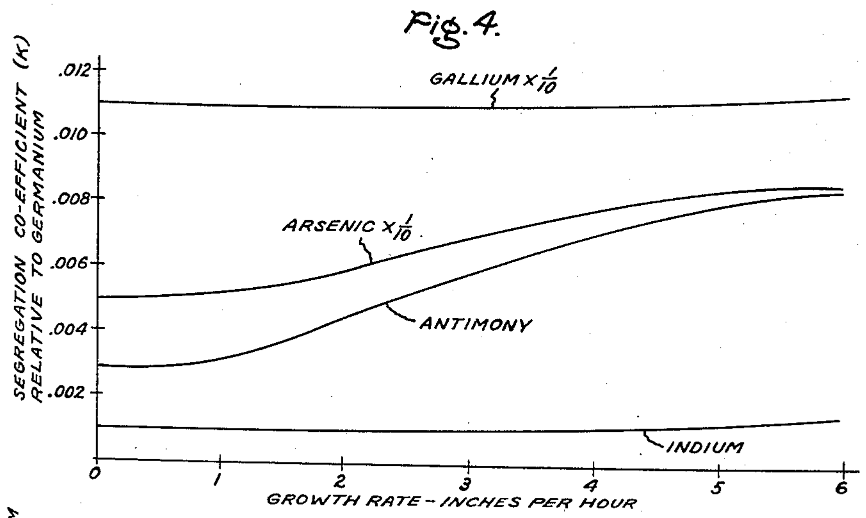
Fig. 4 is a group of curves illustrating the general variation of segregation coefficient with growth rate variation for certain exemplary acceptor and donor impurities relative to germanium.

The specific donor and acceptor impurities as well as the relative and absolute amounts of such impurities to be included in melt 39 may be determined from the segregation coefficient versus growth rate characteristic curves of such impurities for the semiconductor involved. The segregation coefficient represents the amount of impurity assimilated by the growing ingot relative to the amount of the impurity in the melt. Fig. 4 illustrates typical segregation coefficient versus growth rate curves relative to germanium for indium, antimony, arsenic, and gallium. As indicated by these curves, the acceptor impurities indium and gallium show little change in segregation coefficient relative to germanium over a range of growth rate variation from zero to 6 inches per hour, while the donor impurities arsenic and particularly antimony display a marked increase in segregation coefficient as the growth rate increases over this range. It will also be noted that there is a wide disparity between the absolute values of the segregation coefficients K of the various impurities involved. Table I shows the general magnitude and manner of variation of segregation coefficient with growth rate relative to germanium for the designated donor and acceptor impurities:

TABLE I

| Relative to Germanium | Acceptors | | Donors | |
|---|---|---|---|---|
| | Indium | Gallium | Antimony | Arsenic |
| K at 1"/hr | 0.0011 | 0.11 | 0.003 | 0.05 |
| K at 3"/hr | 0.0011 | 0.11 | 0.005 | 0.07 |
| K at 5"/hr | 0.0012 | 0.12 | 0.006 | 0.08 |

The values of segregation coefficients shown in the above table and represented by the curves of Fig. 4 were obtained by conductivity measurements of germanium crystals grown at different steady state growth rates from a melt of germanium containing the impurity involved. Due to limitations in measurement conditions, the indicated values may well include measurement errors of the order of plus or minus 10%.

The variations of the segregation coefficients of various acceptor and donor impurities in silicon is somewhat less than in germanium and is difficult to measure at fast growth rates. However, a comparison of the relative segregation of selected donor and acceptor impurities may be had by referring to the following table of equilibrium segregation coefficients. The equilibrium segregation coefficients $K_0$ of an impurity in a semiconductor is defined as the impurity content of a growing crystal to the impurity content of the melt in equilibrium with the crystal (zero growth rate).

TABLE II

| Impurity | $K_0$ in Ge | $K_0$ in Si |
|---|---|---|
| B | ~20 | 0.68 |
| Al | 0.1 | 0.0016 |
| Ga | 0.10 | 0.004 |
| In | 0.0011 | 0.0003 |
| P | 0.12 | 0.04 |
| As | 0.04 | 0.07 |
| Sb | 0.003 | 0.018 |

The following equation is believed to describe the general variation of the segregation coefficient K with growth rate for a given impurity relative to the semiconductor:

$$K=K_0+(K_a-K_0)e^{\frac{-V_i}{V}}$$

where $K_0$ is the concentration of impurity content in the volume of the solid relative to that in the liquid in equilibrium, $K_a$ is the concentration of impurity content in the surface monolayer of the growing solid crystal relative to that in the liquid, V is the instantaneous growth velocity, and $V_i$ is a growth velocity factor characteristic of the particular impurity and dependent upon the measured diffusion coefficient of this impurity in the semiconductor.

Referring now to Fig. 5, a pair of total segregation versus growth rate characteristic curves relative to germanium for antimony and gallium are superimposed in order to illustrate how variation in growth rate can produce N- or P-type material, as desired, when proper proportions of these two impurities are present in melt 39. Presuming a proper proportion of antimony and gallium in melt 39, there is a particular growth rate hereinafter called the "intrinsic growth rate," shown in Fig. 5 as 2 inches per hour, at which the electrical activity of the positive type carriers or "holes" induced in the grown germanium ingot by the percent of gallium assimilated exactly balances the electrical effect of the negative type carriers or free electrons furnished by the percent of antimony assimilated. The proper proportions of a donor and acceptor impurity which produces a particular intrinsic growth rate may be referred to as effective equivalent amounts since the amount of each tends to exert equivalent, but opposite, control over the electrical characteristics of the ingot. At this intrinsic growth rate, the grown ingot is neither P-type nor N-type. As the growth rate is increased above this intrinsic growth rate, the ratio of antimony to gallium assimilated by the growing ingot increases producing a predominance of negative type carriers resulting in N-type conductivity material. Conversely, as the growth rate decreases below this intrinsic growth rate, the ratio of antimony to gallium picked up by the growing ingot decreases producing a predominance of positive conduction carriers in the semiconductor material thus producing P-type material. It is evident from a consideration of the curves of Fig. 5 that a rapid variation of growth rate, such as 1.0 inch per minute per minute, above and below the intrinsic growth rate will produce in the grown ingot a narrow intrinsic P–N junction region with a "sharp" or "steep" impurity concentration gradient across the junction, while a slow variation in growth rate, such as 0.05 inch per minute, through the intrinsic growth rate will produce a fairly wide intrinsic P–N junction region with a gradual impurity concentration gradient across the junction. The ratio of excess or uncompensated negative conduction carriers in the N-type region to excess or uncompensated positive conduction carriers in the P-type region can be easily adjusted by merely controlling the extent of growth rate variation on either side of the intrinsic growth rate. The impurity concentration gradient at the P–N junction as well as the ratio of excess positive to negative conduction carriers can also be otherwise adjusted by changing the antimony and gallium added to melt 39 to other ratios to produce other desired intrinsic growth rates, at which a greater or lesser difference is present between the slopes of the two illustrated curves. The actual conductivity of the grown N-type or P-type regions can, of course, be controlled by the total amount of both impurities added to melt 39, as well as by the thoroughness of melt stirring since inadequate stirring increases the impurity concentration in the liquid at the growing interface.

As mentioned hereinbefore, there is a possibility of experimental error in recording the values of the segregation coefficients in the hereinbefore set forth table in the curves of Fig. 4. In order to overcome any possibility of such experimental error, the exact relative and absolute amounts of donor and acceptor impurities to be added to a semiconductor melt in order to attain a given intrinsic growth rate may be determined as follows. The information of Fig. 4 and Table I supra, and Tables III and IV, infra, are used to calculate the relative and absolute amounts of donor and acceptor impurities which (in the absence of experimental error) cause the intrinsic growth rate to be located at the desired value for the semiconductor included in the melt. A preliminary small ingot is then grown at growth rates varying continuously through the chosen intrinsic rate of growth. The transition point from N-type to P-type, or vice versa, within this grown ingot is then correlated with the particular growth rate cycle utilized in forming the ingot. This procedure may then be repeated using somewhat different ratios of the same donor and acceptor impurities, and complete empirical data is then assembled from which the ratio of donor to acceptor impurities required for any desired intrinsic growth rate can be easily determined. Conversely, from this data the intrinsic growth rate for any given proportions of a given pair of donor and acceptor impurities may be determined. Actually, the ratio of donor to acceptor impurities which may be included within the melt in order to attain alternate N- and P-type regions within a semiconductor ingot is not critical. The absolute and relative amounts of donor and acceptor impurities utilized vary over a wide range and are chosen according to the application to which the devices cut from the ingot are to be used.

As an example of the wide range over which the impurities may vary, with antimony and gallium as the selected impurities and germanium as the semiconductor, weight ratios ranging between 20 and 60 parts antimony to 1 part gallium may be used, depending upon the junction characteristics desired. With antimony and indium as the selected impurities, weight ratios ranging from 1 part antimony to between 2.5 and 7.5 parts indium may likewise be used. It will be appreciated that the variation of donor to acceptor impurities within the melt determines the growth rate at which an ingot having intrinsic conductivity characteristics may be grown. Thus, for the antimony-gallium impurity system, a ratio of 20 parts antimony to 1 part gallium within the melt results in an intrinsic growth rate of approximately 5 inches per hour, while an antimony-gallium ratio of 50 to 1 results in an intrinsic growth rate of approximately 1 inch per hour. Growth rates above the intrinsic rate result in the formation of N-type regions within the ingot, while growth rates below the intrinsic rate result in the formation of P-type regions within the ingot. The absolute amounts of the two added impurities may also vary to a considerable extent and may be determined in accord with the conductivity desired in the respective P- and N-type regions of the resultant ingot. The higher the conductivity desired in the resultant P–N junction devices, the higher the concentration of donor and acceptor impurities which are added to the melt. Satisfactory ingots have been grown from melts having different acceptor-donor impurity combinations with the total impurity content ranging between 0.1 and 250 milligrams of impurities to 100 grams of germanium. This wide range of possible total impurity content is, of course, also due to the fact that the various donor and acceptor impurities have widely differing segregation coefficients so that widely differing amounts of selected impurities must be added to the melt to produce equivalent effects in the grown semiconductor ingot. For example, approximately 100 times more indium than gallium must be added to a germanium melt to produce the same acceptor impurity content in the grown ingot.

With silicon as the semiconductor in melt 15 and antimony and aluminum as the selected impurities, a weight ratio of between 2.5 and 3.5 parts aluminum to 1 part antimony has been found suitable with the total impurity content of about 4 milligrams impurities per 10 grams of silicon. In silicon, like germanium, as is hereinbefore discussed, the impurity ratios having a higher concentration of donor impurity elements with respect to acceptor impurity elements results in a lower intrinsic growth rate, while, on the other hand, ratios having low donor percentages with respect to acceptor impurities result in a higher intrinsic growth rate. Successful P–N junctions have been produced over a wide variation of absolute and relative amounts of donor and acceptor impurities, for example, successful P–N junctions have been produced using silicon melts containing from 0.1 to 10 milligrams of total impurities per 10 grams of silicon.

The ranges within which the absolute values of various donor and acceptor impurities which are added to 100 grams of germanium and silicon melts may vary in practicing the invention are listed in Table III.

TABLE III

| | Germanium, mg. | Silicon, mg. |
|---|---|---|
| aluminum | 0.007 to 0.7 | 1.5 to 150 |
| gallium | 0.017 to 1.7 | 1.5 to 150 |
| indium | 2.4 to 240 | 33 to 3,300 |
| phosphorus | 0.006 to 0.60 | 0.07 to 7.0 |
| arsenic | 0.05 to 5.0 | 0.1 to 10 |
| antimony | 1.0 to 100 | 0.6 to 60 |

The above ranges of values represent the absolute amounts of the designated impurities which would be effective, if individually added to an otherwise pure semiconductor melt, to cause ingots grown therefrom at a growth rate of 2 inches per hour, to contain impurity induced carrier concentrations varying between $10^{14}$ and $10^{16}$ carriers per cubic centimeter.

It does not follow from the data of Table III that any listed absolute value of a donor impurity may be combined with any listed absolute value of an acceptor impurity to form an alloy, which when added to a semiconductor melt, will cause an intrinsic growth rate to exist between zero and 20 inches per hour. As a further requirement, the relative amounts of donor and acceptor impurities must be such that the product of the number of moles of donor impurity chosen and the segregation coefficient thereof at the desired growth rate is approximately equal to the product of the number of moles of acceptor impurity chosen and the segregation coefficient thereof. Thus, at the desired intrinsic growth rate, approximately equal numbers of atoms of donor and acceptor impurities will enter the semiconductor crystal lattice. The absolute amount of a donor impurity which is sufficient to result in a chosen intrinsic growth rate when added to a semiconductor to which a given absolute amount of acceptor impurity has been added may be referred to as an effective equivalent amount to the amount of acceptor impurity chosen and for the particular chosen growth rate. Thus, effective equivalent amounts of donor and acceptor impurities have equivalent control of the electrical properties of the grown ingot at the intrinsic growth rate. Conversely, if an absolute amount of a donor impurity, within the limits set forth in Table III is added to a semiconductor, there exists one, and only one, effective equivalent amount of each acceptor impurity which may be added to the semiconductor in order to secure any one chosen intrinsic growth rate. The approximate amount of the effective equivalent amount may be calculated, within experimental accuracy, from the values of segregation coefficients as a function of growth rate as set forth in Table I and the curves of Fig. 4.

The ranges of proportions within which the absolute amounts of various combinations of the principal donor and acceptor impurities may be varied in a semiconductor melt so that the effective equivalents mixed with one another establish an intrinsic growth rate between 0 and 20 inches per hour are set forth below.

TABLE IV (a) PROPORTIONS IN GERMANIUM

| | | |
|---|---|---|
| $\frac{Sb}{Ga}$ 20 to 60 | $\frac{As}{Ga}$ 0.9 to 2.7 | $\frac{P}{Ga}$ 0.13 to 0.4 |
| $\frac{Sb}{In}$ 0.13 to 0.4 | $\frac{As}{In}$ 0.006 to 0.018 | $\frac{P}{In}$ 0.0008 to 0.0026 |
| $\frac{Sb}{Al}$ 48 to 140 | $\frac{As}{Al}$ 2.2 to 6.3 | $\frac{P}{Al}$ 0.3 to 0.9 |

(b) PROPORTIONS IN SILICON

| | | |
|---|---|---|
| $\frac{Sb}{Ga}$ 0.5 to 0.7 | $\frac{As}{Ga}$ 0.06 to 0.08 | $\frac{P}{Ga}$ 0.04 to 0.05 |
| $\frac{Sb}{In}$ 0.01 to 0.02 | $\frac{As}{In}$ 0.0045 to 0.004 | $\frac{P}{In}$ 0.0015 to 0.002 |
| $\frac{Sb}{Al}$ 0.3 to 0.4 | $\frac{As}{Al}$ 0.05 to 0.07 | $\frac{P}{Al}$ 0.02 to 0.03 |

It is to be noted, however, that the values given above for arsenic and phosphorus as impurity additions in a silicon melt are approximate only, due to evaporation of these impurities at the high temperatures necessary to maintain silicon molten.

As is hereinbefore set forth, a variation of the proportion between given donor and acceptor impurities added to a semiconductor melt results in, and is the means for obtaining, differing intrinsic growth rates. It will be appreciated, however, that once the effective equivalent amounts of chosen acceptor and donor impurities have been added to a given amount of semiconductor, the intrinsic growth rate for the particular melt is established and is not changed in practicing the invention. In general, as the proportion of donor to acceptor impurity is increased in preparing different melts, the intrinsic growth rate of the melt decreases, approaching zero as a limit.

The donor and acceptor impurities may be added to the melt in a number of ways. One convenient and practical method is to add the donor and acceptor impurities individually. Another method is to prepare an alloy of the selected donor and acceptor impurities having a proper ratio as determined by the above-described relationships and procedures. The molten alloy is quenched from its melting point by direct immersion in water in order to prevent segregation of the two impurities. Alternatively, the two impurity elements may be ground together into a powder and sintered into pellets. An appropriate quantity of high purity semiconductor together with effective equivalent amounts of donor and acceptor impurities sufficient to establish an intrinsic growth rate at a value between zero and 20 inches per hour are placed in crucible 5. The donor and acceptors may conveniently be added in the form of an alloy or sintered mixture described above. The amount of alloy or mixture added may vary considerably, satisfactory P-N junctions being produced using 0.1 to 10 milligrams arsenic-gallium alloy, 1 to 100 milligrams antimony-gallium alloy, and from 5 to 250 milligrams antimony-indium alloy for each 100 grams germanium.

Referring now to Figs. 6 and 7, there is illustrated a preferred pattern or cycle of growth rate variation capable of providing N-P-N junction units particularly well suited for use in high frequency transistors. Units destined for this particular application preferably have an extremely thin P-type layer. Such thin P-type layers are obtained by causing the already formed P-type layers to melt back into the melt upon the next high power portion of the hereinafter described power variation cycle. This melting back is attained by increasing the amplitude of the power cycle and causing the slow growth portion of the growth rate cycle to decrease through the zero value. A further condition for the growth of thin P-type layers is the choice of an intrinsic growth rate very nearly equal to zero so that when, after remelting, the growth rate again becomes positive, only a thin P-type layer is formed before the intrinsic growth rate is reached. Consequently, a ratio of donor to acceptor impurity is selected which provides a fairly slow intrinsic growth rate, for example, in the neighborhood of ½ inch per hour. If antimony and gallium are used, a weight ratio of the order of 50 parts antimony to 1 part gallium is suitable, while if antimony and indium are employed, a weight ratio of the order of 1 part antimony to 3 parts indium has been found suitable. Lower antimony-to-gallium or antimony-to-indium ratios produce wider P-type layers. The actual amount of acceptor-donor impurity alloy included in melt 39 is preferably of the order of 1 to 50 milligrams alloy per 100 grams germanium depending upon the impurities involved and the electrical characteristics desired. More specifically, 1 to 20 milligrams antimony-gallium alloy and 10 to 100 milligrams antimony-indium alloy may be added for each 100 grams of germanium.

In Fig. 6, curve A represents furnace power, curve B represents the rate of ingot growth, and curve C represents the position of the liquid-to-solid interface relative to the growing ingot, all curves being plotted along the same time base. It will be appreciated that the position of the liquid-to-solid interface is visually determinable, and that it rises or falls relative to the free surface level of the melt as the power input to the furnace and, consequently, the temperature gradient across the liquid-to-solid interface increases or decreases respectively while the crystal is growing. During the initial conditions of the ingot growth represented by the initial portion of each curve, an average level of power is supplied to the furnace which produces a rate of growth above the intrinsic growth rate, for example, an average growth rate of 3 inches per hour when the intrinsic growth rate is ½ inch per hour. The necessary power will vary with each furnace, but the proper average power input may readily be determined by following the hereinbefore described procedures or by previously calibrating the furnace power input as described hereinafter. After such constant growth rate conditions have been established, a cycle of furnace power variation above and below this initial average power level is established by swinging the amplitude of the applied furnace power above and below the initial average power level in successively increasing amplitude steps of equal duration until the desired peak-to-peak power amplitude swing is achieved. Alternatively, the amplitude of the power variation is maintained throughout at a full desired peak-to-peak amplitude, but the duration of each swing is gradually increased until the desired power alternation duration is achieved.

As mentioned hereinbefore, the rate of crystal growth in the seed crystal withdrawal method of crystal growth varies inversely with the temperature gradient across the liquid-solid interface. This temperature gradient depends to a large extent upon the temperature of the liquid melt, which in turn depends upon the power input to the furnace heater. It would appear, at first glance, that the rate of growth might be adequately specified in its relationship to melt temperature. Such might possibly be true in the case of growing a crystal at constant growth rate in which case a measurable average equilibrium temperature is maintained in the liquid melt. In the practice of my invention, however, the melt does not reach an equilibrium condition at which the temperature is substantially uniform throughout the melt. Instead, furnace power is rapidly cycled between maximum and minimum values so that at all times there exists a substantial temperature gradient from the liquid-solid interface to the walls of crucible 5. Thus, while it is known that the temperature at the liquid-solid interface is substantially the melting temperature of the semiconductor, and that all the remainder of the melt is above this temperature, no further measurement of melt temperature is practicable. This is true for two reasons. Firstly, the rapid cycling of the furnace prevents an equilibrium temperature being established, so that there is no real "melt temperature" as such. Secondly, with such rapidly fluctuating temperatures, the only feasible method of measuring instantaneous temperature is by the insertion of a measuring device having a rapid time constant, such as a thermocouple, into the melt, and the use of such devices is precluded by the necessity of maintaining the purity of the semiconductor to the order of parts per million, as is well known to be a prime prerequisite for all electronic semiconductor devices.

During this gradual power cycle build-up, the operator can watch the actual variation in growth rate as indicated by the position of the liquid interface on the growing ingot, and can make such adjustments of the average power level as may be necessary to keep the average diameter of the growing ingot uniform. Thus, if the diameter of the ingot increases, the average power must be raised slightly and if the diameter decreases, the average power must be lowered slightly.

With the constant-duration amplitude-varying-type build-up of the power cycle illustrated in Fig. 6, the initial small increase in furnace power during the time interval designated by the letter E is shown as being sufficient to reduce the growth rate below the intrinsic growth rate but insufficient to reach a zero growth rate. The rate of ingot growth thus decreases during this interval and converts from N-type to P-type semiconductor, but does not stop growing. During the next time interval, designated by the letter F, the furnace power is reduced to a level which causes a gradual increase in growth rate until the ingot converts from P-type back to N-type semiconductor.

During the succeeding time interval, designated by the letter G, the furnace power is shown as being elevated to a maximum desired level at which the growth rate rapidly decreases through the intrinsic growth rate and through the zero growth rate. This results in a portion of the grown ingot actually melting back. During this portion of the cycle, the liquid-solid interface, which is clearly visible, may be seen to rise up the column by 2 or 3 millimeters. As shown by curve C, the melted-back portion of the grown ingot includes all of the P-type material and a portion of the N-type material last grown. It will be appreciated that the amplitude and duration of furnace power required to produce this melting-back action can be easily adjusted by merely watching the climbing movement of the liquid interface up the ingot as the melt temperature gradient increases.

The criteria by which the operator may judge the behavior of the growing crystal in order to properly regulate the applied heater power in order to practice the invention are quite simple. A determination of whether the growth rate is increasing or decreasing and of whether or not a decreasing growth rate has passed beyond the zero growth rate and the ingot is actually being remelted depends upon the relative velocities of the seed crystal and the liquid-solid interface. As has been hereinbefore discussed, the seed crystal is withdrawn at a constant velocity generally of the order of 3 inches per hour. When the growth rate of the crystal equals the rate of withdrawal, the conditions hereinbefore described prevail such that the diameter of the crystal remains substantially the same and the liquid-solid interface remains at a stationary position. As the growth rate increases under the influence of diminishing heater power and exceeds the rate of withdrawal, the liquid-solid interface recedes down the crystal toward the surface of the melt and may, at the lowest power level, even spread out over the surface of the melt. Such motion is indicative of an increasing growth rate. When under the impetus of increased input power the growth rate decreases and becomes less than the rate of withdrawal, the liquid-solid interface rises with respect to the surface of the melt. The actual growth rate is, therefore, the difference between the velocity of the rising seed crystal and the velocity of upward motion of the solid-liquid interface. When the liquid-solid interface is rising at the same rate that the crystal is being withdrawn from the melt, it follows that the growth rate is then zero. If the liquid-solid interface rises at a faster velocity than the velocity of the seed crystal, the growth rate is negative or, in other words, the crystal is not growing but is melting back.

It thereby follows that the operator may readily adjust the power cycle in order to attain the growth rate variation desired. When the operator sees that the liquid-solid interface is rising, he knows the growth rate has decreased below the rate of withdrawal. When he sees the liquid-solid interface rising at a greater rate than the rate of withdrawal of the seed crystal, he knows that the crystal is melting back. When he sees that the liquid-solid interface is falling, he knows that the growth rate has increased above the rate of withdrawal. These criteria, together with the knowledge that growth rate must alternately increase and decrease through the intrinsic growth rate in order to provide alternate N-type and P-type semiconductor regions within the crystal, enable the operator properly to increase and decrease input power in order to attain the desired results.

During the next interval, designated by the letter H, the furnace power is decreased to a desired minimum level until growth again begins, and the growth rate increases to produce first P-type and then N-type material. Due to the melting-back of the grown ingot, the P-type material grown during the prior high power level interval G is eliminated, and the only P-type material remaining in the grown ingot is that which is grown as a result of the increase in growth rate during this latter low power level interval H. P-type layers having a thickness less than .001 inch may thus be grown by a change in furnace power sufficient to produce a rate of change of growth velocity during this interval H of the order of 0.5 inch per minute per minute. The relative duration of the high and lower power level periods may conveniently be made equal as shown in Fig. 5. Each power level condition E, F, G and H may conveniently have a 1-minute duration when germanium ingots are grown and a ½-minute duration when silicon ingots are grown.

Although it is desirable, for the production of transistor devices having optimum characteristics, that the melt-back cycle completely melt the last formed P-type region, complete melting back is not necessary, as any melting back of the P-type region during the high power input portion of the heating cycle will reduce the thickness of the P-type region finally formed in the growing ingot. Thus, while an experienced operator after making several ingots according to the invention will know from experience how to completely melt back the P-type region, improved transistor devices will be produced as long as the operator observes any melting back during the high power heat input cycle. This will be obtained as is hereinbefore described when the rising liquid-solid interface is observed to rise at a rate faster than the rate of withdrawal of the seed crystal from the melt.

It will be appreciated that the power variations necessary to cause the growth rate of semiconductor ingot 41 to pass through the preselected intrinsic growth rate, and thus form P–N junctions therein, as well as the power input necessary to cause ingot 41 to melt back will be different for each apparatus used. It is, however, a simple matter to calibrate any particular crystal growing apparatus. This may be done by preparing a melt having a preselected intrinsic growth rate and, after establishing constant growth conditions as hereinbefore discussed, growing a preliminary monocrystalline ingot with power input variations which progressively increase in selected increments. The grown ingot may then be removed and tested for P–N junctions by the method described with particularity hereinafter. The point at which P–N junctions form within the ingot, as well as the point at which extremely thin P-type layers, indicative of melting back, form, may be correlated with the power amplitude variations supplied to the apparatus to determine precisely the amplitude of power variations necessary to form P–N junctions and thin P-type layers with the particular apparatus.

The practice of the invention as described above with respect to Fig. 6 results in the formation of an ingot having a shape and impurity distribution partially shown in Fig. 3. It will be noted that the thickness variations in ingot 41 are small as compared with the total thickness of the ingot.

Fig. 7 shows the excess donor or acceptor impurity content variation along the length of an ingot 41, represented diagrammatically by bar 42, grown in accord with the growth rate cycle of Fig. 6. The initially grown portion 43 of ingot 41, corresponding to the initial steady growth conditions of Fig. 6 has a slight excess of donor impurities producing N-type material. This donor impurity excess gradually decreases during the slight furnace power increase interval E until there is a gradual build-up of excess acceptor impurities producing a P-type semiconductor region 44. The intermediate P–N junction 45 is thus a fairly wide junction region with a gradual impurity content gradient across the junction. The next portion 46 of ingot 41 is grown during the lower power interval F of Fig. 6 and has a gradual decrease in excess acceptor impurity and a gradual build-up of excess donor impurity until the material becomes very heavily N-type. The resulting P–N junction 47 is similar to that of junction 44 with a low impurity content gradient across the junction region. It will be appreciated that during these initial power cycle amplitude build-up periods E and F, there is no melting back of the grown ingot. The next significant portion 50 of ingot 41 is grown during the minimum power level interval H, since the portion of the ingot that was grown during maximum power level interval G is substantially eliminated from the final ingot by the melting back which occurs during this maximum power level interval G. The impurity concentration in the final ingot thus drops abruptly from a great excess of donor impurities to a moderate excess of acceptor impurities to produce a very narrow P–N junction 49 with a sharp impurity concentration gradient across the junction and a high ratio of negative conduction carriers to positive conduction carriers on opposite sides of the junction. P–N junction 49 is thus ideally suited for use as an emitter junction in a transistor. The excess acceptor impurity bordering P–N junction 49 in P-type layer 50 gradually decreases and the donor impurity content increases as the ingot growth begins and accelerates to produce another P–N junction 51 wider than junction 49 and having a lower impurity content gradient thereacross. P–N junction 51 is thus ideally suited for use as the collector junction in a transistor. If the acceleration of growth rate is less than 0.8 inch per minute per minute, junction 51 ordinarily has a capacitance less than 10 micromicrofarads per square millimeter at a reverse bias voltage of 4.5 volts across the junction.

By the above detailed description I have outlined the basic principle upon which my invention is based, a typical apparatus with which the invention has been practiced and the several various modes of practicing the invention. Also described are the ranges of absolute and relative amounts of various donor and acceptor impurities which may be added to a semiconductor melt in order that a monocrystalline ingot having many P–N junctions therein may be grown by seed crystal withdrawal. In this respect, it will be noted that there are two alternative ways of practicing the invention.

In the first alternative, relative amounts of donor and acceptor impurities are added to a semiconductor melt so as to fix the intrinsic growth at a value very nearly equal to the average rate of crystal growth (rate of crystal withdrawal) and the growth rate is periodically cycled above and below this value in substantially equal increments, thus producing alternate regions of N- and P-type semiconductor having P–N junctions therebetween with gradual impurity concentration gradients.

In the second alternative, relative amounts of donor and acceptor impurities are chosen so as to locate the intrinsic growth rate at a value very nearly zero as for instance ½ inch per hour. The growth rate is then cycled above and below the average rate of crystal growth with an amplitude great enough to cause growth rate to become negative during the high power portion of the power cycle, at which time a portion of the crystal ingot including the last-formed P-type layer is melted back. Practicing the invention in this manner results in the formation of a monocrystalline ingot having many N-type regions, separated from one another by thin P-type regions having a thickness of the order of 0.001 inch or less.

While the invention has been broadly set forth hereinbefore, there are set forth at this point four specific examples of how the invention has been practiced. Example 1 describes the growth of a monocrystalline germanium ingot having alternating wide regions of P- and N-type conductivity according to the first alternative mode. Example 2 describes the growth of a monocrystalline ingot of silicon of substantially the same characteristics. Example 3 describes the growth of a monocrystalline germanium ingot having extremely thin P-type regions by the second alternative mode in which a portion of the ingot is actually melted back. Example 4 describes the growth of a silicon ingot having the same general characteristics, also utilizing the second alternative mode in which a portion of the ingot is melted back.

*Example 1*

The apparatus shown in Fig. 1 and described hereinbefore was used in the practice of this example. Fifty grams of high purity germanium were etched in a 1-to-3 by volume mixture of hydrofluoric acid and nitric acid to remove surface impurities. The germanium was then rinsed successively in distilled water, methyl alcohol and carbon tetrachloride and dried with compressed air. The etched germanium together with 10 milligrams of antimony and 0.3 milligram of gallium in individual quantities were placed in crucible 5. A seed crystal 40 of germanium was placed within chuck 32 and transparent chimney 7 was lowered over the crucible and formed a substantially gas-tight seal therewith. The area within was flushed with argon and argon was supplied through inlet 30 maintaining a positive pressure of approximately 1 centimeter of mercury above atmospheric pressure over the crucible. Nitrogen at a positive pressure of 1 centimeter of mercury was supplied to the bottom of the heater element through inlet pipe **13*a*. 1440 watts of 60-cycle alternating current power were supplied to resistance heater 4 for 15 minutes in order to melt the germanium and the designated impurities. When the materials within the crucible became molten, the heater power was reduced to 1000 watts. Chuck 32 holding seed crystal 40 was caused to rotate at a rotation speed of 100 revolutions per minute and was lowered mechanically until seed crystal 40** contacted the surface of the melt. When the seed crystal was observed to have become partially melted and became integral with the surface of the melt, the chuck was withdrawn at a rate of 3 inches per hour. Minor adjustments in heater power of the order of 5 or 10 watts were made to compensate for instrument inaccuracies in order to maintain a constant ingot diameter of ½ inch. With a constant withdrawal rate of 3 inches per hour, power input to the heater was raised to 1210 watts and maintained at this value for 40 seconds. At the end of 40 seconds, heater input power was lowered to 640 watts and maintained at that value for 20 seconds. At the end of 20 seconds the power was raised again to 1210 watts and maintained at that value for 40 seconds. The cycle was repeated continuously switching alternately between 40-second periods of 1210 watts and 20-second periods of 640 watts power input. This rate of growth was maintained for 1 hour and 20 minutes until the entire melt was withdrawn in the form of a single crystal 4 inches long. The single crystalline ingot was then removed from the chuck and was found to contain alternate regions of P- and N-type germanium suitable for the formation of P–N junction rectifiers.

*Example 2*

The apparatus shown in Fig. 1 and described hereinbefore was used in the practice of this example. Twenty grams of high purity silicon were etched in a 1-to-3 mixture by volume of hydrofluoric acid and nitric acid to remove surface impurities. The silicon was then rinsed successively in distilled water, methyl alcohol and carbon tetrachloride and dried with compressed air. The silicon together with 4 milligrams of antimony and 7 milligrams of gallium in individual quantities were placed in crucible 5. A seed crystal 40 of silicon was placed within chuck 32 and transparent chimney 7 was lowered over the crucible forming a substantially gas-tight seal therewith. The area within the chimney was flushed with argon and argon was supplied through inlet pipe 30 maintaining a positive pressure of 1 centimeter of mercury above atmospheric pressure over the crucible. Nitrogen at a positive pressure of 1 centimeter of mercury was supplied to the bottom of the heater element through inlet pipe **13*a*. 2800 watts of 60-cycle alternating current power were supplied to resistance heater 4 for 11 minutes in order to melt the silicon and the designated impurities. When, after approximately 11 minutes, the materials within the crucible become molten, heater power was reduced to 2300 watts. Chuck 32 holding seed crystal 40 was caused to rotate at a rotation speed of 100 revolutions per minute and was lowered mechanically until seed crystal 40** contacted the surface of the melt. When the seed crystal was observed to have partially melted and become integral with the surface of the melt, the chuck was withdrawn at a rate of 3 inches per hour. Slight increases and decreases in heater power of the order of 5 or 10 watts to compensate for instrument inaccuracies were made in order to maintain a constant ingot diameter of ½ inch. With a constant withdrawal rate of 3 inches per hour, power input to the heater was raised to 2500 watts and maintained at this value for 20 seconds. At the end of 20 seconds, heater input power was lowered to 2100 watts and maintained at that value for 20 seconds. At the end of 20 seconds the power was raised again to 2500 watts and maintained at that value for 20 seconds. The cycle was repeated continuously, switching alternately between 20-second periods of 2500 watts and 20-second periods of 2100 watts input power. This rate of growth was maintained for 85 minutes until the entire melt was withdrawn in the form of a single crystal 4 inches long. The single crystalline ingot was then removed from the chuck and was found to contain alternate regions of P- and N-type silicon suitable for the formation of P-N junction rectifiers.

*Example 3*

The apparatus shown in Fig. 1 and described hereinbefore was used in this example. Fifty grams of high purity germanium were etched in a 1-to-3 mixture by volume of hydrofluoric acid and nitric acid to remove surface impurities. The germanium was rinsed successively in distilled water, methyl alcohol and carbon tetrachloride and dried with compressed air. The germanium together with 10 milligrams of antimony and 0.2 milligram of gallium in individual quantities were placed in crucible 5. A seed crystal 40 of germanium was placed within chuck 32 and transparent chimney 7 was lowered over the crucible mating with the inverted conical upper section of crucible 5 forming a substantially gas-tight seal therewith. The chimney was flushed with argon to remove the air therefrom and argon was pumped into chimney 7 through entrance tube 30 and maintained within chimney 7 a slight positive pressure of the order of 1 centimeter of mercury above atmospheric pressure. The excess gas escaped through vent hole 31 within lower flange 25 of chimney 7. Nitrogen at a positive pressure of 1 centimeter of mercury was supplied to the bottom of the heater element through inlet pipe **13*a*. 1440 watts of 60-cycle alternating current power were supplied to graphite heater 4 for 15 minutes to melt the germanium and the impurities within crucible 5. When the materials within crucible 5 became molten, the heater power was reduced to 1000 watts. Chuck 32 holding seed crystal 40 was caused to rotate at a rotation speed of 100 revolutions per minute and was lowered mechanically until seed crystal 40** contacted the surface of the melt. When the seed crystal was observed to have become partially melted, the chuck was withdrawn from the melt at a rate of 3 inches per hour. At this point, minor adjustments in furnace power of the order of 5 or 10 watts to compensate for instrument inaccuracies were made in order to maintain a constant thickness ingot having a diameter of approximately ½ inch. With a monocrystalline ingot growing at a uniform growth rate and uniform rate of withdrawal both of 3 inches per hour, a power variation cycle was begun. The cycle consisted of periods 1 minute in length comprising a 40-second period during which heater power was maintained at 1440 watts and 20-second period during which no heater power was supplied. This cycle was repeated once each minute during the entire rate growing process. During the high power portion of the rate growing cycle, the liquid-solid interface, which was clearly visible, could be seen to recede up the ingot 2 or 3 millimeters. During the portion of the cycle where the power was turned off, the crystal could be seen to grow down and outward into the melt. Most of this growth was removed during the following high power cycle. Only a portion of the first grown crystal equal to the shaft elevation per cycle remained at the end of the high power portion of the cycle. This repeated cycling of the input power to the crucible was maintained all the while that the seed crystal is being withdrawn at a constant rate of 3 inches per minute and rotated at a revolution speed of 100 revolutions per minute. The cycle was continued for 80 minutes until the germanium was exhausted from the crucible at which time power was turned off and a 4-inch-long ingot removed from the chuck. The ingot was then found to contain a plurality of thin, P-type regions which were of the order of 0.001 inch thick or less. Bars .025 inch square in cross section and 1/16 inch long, including a P-type region and 2 adjacent N-type regions extracted therefrom, were found to be suitable for the formation of high gain, high frequency transistors.

*Example 4*

The apparatus shown in Fig. 1 and described hereinbefore was used in this example. Twenty grams of high purity silicon were etched in a 1-to-3 mixture by volume of hydrofluoric acid and nitric acid to remove surface impurities. The silicon together with 4 milligrams of antimony and 6 milligrams of gallium in individual quantities were placed in crucible 5. A seed crystal 40 of silicon was placed within chuck 32 and transparent chimney 7 was lowered over the crucible, mating with the inverted conical upper section of crucible 5 forming a substantially gas-tight seal therewith. The chimney was flushed with argon to remove the air therefrom and argon was pumped into chimney 7 through entrance tube 30 to maintain within chimney 7 a slight positive pressure of the order of 1 centimeter of mercury above atmospheric pressure. The excess gas escaped through vent hole 31 within lower flange 25 of chimney 7. Nitrogen at a positive pressure of 1 centimeter of mercury was supplied to the bottom of the heater element through inlet pipe **13*a*. 2800 watts of 60-cycle alternating current power were supplied to graphite heater 4 to melt the silicon and the impurities within crucible 5. When, after approximately 10 minutes, the materials within the crucible became molten, heater power was reduced to 2300 watts. Chuck 32 holding seed crystal 40 was caused to rotate at a rotation speed of 100 revolutions per minute and was lowered mechanically until seed crystal 40** contacted the surface of the melt. When the seed crystal was observed to have become partially melted, the chuck was withdrawn from the melt at a rate of 3 inches per hour. At this point, minor adjustments in furnace power of the order of 5 to 10 watts to compensate for instrument inaccuracies were made in order to maintain a constant thickness ingot having a diameter of approximately ½ inch. With a monocrystalline ingot growing at a uniform growth rate of 3 inches per hour and uniform rate of withdrawal of 3 inches per hour, a power variation cycle was begun. The cycle consisted of periods 36 seconds in length comprising a 30-second period during which heater current was maintained at 2760 watts and a 6-second period during which current was turned completely off. This cycle was repeated continuously during the entire rate growing process. During the high power portion of the rate growing cycle, the liquid-solid interface which was clearly visible could be seen to recede up the ingot 2 or 3 millimeters. During the portion of the cycle where the power has been turned off, the crystal could be seen to grow down and outward into the melt. Most of this growth was removed during the following high power cycle. Only a portion of the first grown crystal equal to the shaft elevation per cycle remained at the end of the high power portion of the cycle. This repeated cycling of the input power to the crucible was maintained all the while that the seed crystal was withdrawn at a constant rate of 3 inches per minute and rotated at a revolution speed of 100 revolutions per minute. The cycle was continued for 90 minutes, after which the silicon was exhausted from the crucible. The power was then turned off and a 5-inch-long ingot was removed from the chuck. The ingot was then found to contain a plurality of N-type regions separated from one another by thin, P-type regions of the order of 0.001 inch thick or less and forming P-N junctions with adjacent N-type regions. Bars .025 inch square in cross section and 1/16 inch long extracted therefrom and including 2 such P-N junctions were found suitable for high gain, high frequency transistors.

An N-P-N junction unit in the form of a thin bar, such as included in the transistor device shown in Fig. 8, may be easily extracted from the grown ingot 41 as shown by Examples 3 and 4 by slicing the ingot longitudinally into bars having a width about 0.25 inch and a thickness preferably less than .040 inch for power application, substantially smaller dimension for high frequency application, and then breaking or cutting the resulting bars in the centers of their N-type regions, for example, along the dashed lines 52 of Fig. 7. By employing a fairly high rate of power cycling at a slow elevation, in other words, a complete high-to-low power cycle duration of a few minutes, for example, 2 to 5 minutes at an elevation rate of 1 to 3 inches per hour, over 100 P-N junctions may be grown cross-sectionwise along the length of a single ingot, giving rise to several thousand small N-P-N junction bars, such as illustrated in Fig. 8. In actual dimensions, at least 1/16 inch of N-type region should be grown between each P-type layer so that the bars sliced from the grown ingot may be broken apart without danger of cutting across a P-N junction. The physical location of the P-N junctions along the length of the extracted bar can be easily determined by applying to opposite ends of the bar an alternating voltage having an amplitude of approximately 500 volts and then pouring a benzene or carbon tetrachloride suspension of barium titanate over the bar. As a result of the potential difference generated across each P-N junction, this barium titanate suspension collects as a fine visible white line only along the surface of the bar at each P-N junction.

Referring now to Fig. 8, there is shown a high frequency transistor 56 incorporating an N-P-N junction wafer-type unit produced in accord with the above-described methods. A first wire electrode 57, constituting the emitter electrode, is connected by such means as a fused tin or antimony contact 58 to N-type region 59 bordering emitter P-N junction 49. A second wire electrode 60, constituting the collector electrode, is similarly connected by such means as a fused tin or antimony contact 61 to the opposite N-type region 62 bordering the collector P-N junction 51. A third wire electrode 63, constituting the base or return electrode, is connected to the P-type "base" layer 50 by an acceptor impurity, such as by a fused indium contact 64. P-type base layer 50 is so thin (preferably less than .001 inch) that it is normally extremely difficult to connect electrode 63 only to this P-type layer 50 without short-circuiting P-N junctions 49 and 50. The use of an acceptor impurity, such as indium, as the connecting medium enables the connection to spread over from P-type region 50 into N-type regions 59 and 62 without danger of short-circuiting junctions 49 and 51 since a rectifying P-N junction barrier is also set up between each N-type region and the region of the semiconductor to which the indium is fused.

One method preferably employed for making this fused indium dot connection is to place a small drop or dot of indium upon the surface of the P-type semiconductor layer 50, press or imbed wire 63 into the top surface of this indium dot, and then heat the entire unit for a few minutes at a temperature in the neighborhood of 400 degrees C. to cause the indium to fuse to wire 63 and to the surface of the N-P-N junction unit, thereby bonding the entire electrode connection together. The surface-adjacent portion of each N-type semiconductor region 59 and 62 to which the indium fuses is converted into P-type semiconductor by the resulting indium impregnation and diffusion with a P-N junction at the limit or boundary of such acceptor impurity penetration. The indium dot simultaneously makes an excellent conduction carrying connection to P-type base layer 60. Such P-N junction overlapping indium dot connection forms a portion of the subject matter covered by my patent application, Serial No. 321,262, filed November 18, 1952, and assigned to the present assignee. The method of producing P-N junctions by the diffusion of an acceptor impurity to a limited depth within an N-type semiconductor body forms a portion of the subject matter described and claimed in a patent application, Serial No. 187,490, filed September 29, 1950, by William C. Dunlap, Jr., and assigned to the present assignee.

In one well-known manner of operating high frequency transistor 56, a small change in high frequency current between electrodes 63 and 57 with emitter junction 49 biased in the easy flow direction produces a much larger change in the current which flows between electrodes 63 and 60 with collector junction 51 biased in the difficult flow direction. The extremely thin dimension of P-type layer 50, less than .001 inch, as well as the high ratio of negative to positive conduction carriers bordering junction 49, insures high emissivity of collector current controlling electrons into P-type base layer 50. The thin dimension of the P-type layer also reduces phase shifts due to transit time effects, and the wide gradual impurity concentration gradient across collector P-N junction 51 provides a high impedance, low capacity (usually less than 10 micromicrofarads) collector junction insuring high gain. Transistors constructed as described in connection with Fig. 8 have consistently showed current gain factors over 50 under the operating conditions defined above.

Transistors 56, extracted from ingot 41, have many advantages over other types of N-P-N junction transistors including either fused or grown junctions. Due to the fact that no additional impurity additions are made to melt 39 once the rate growing process has begun and that the process repeats cyclically the same crystal growth conditions, the different P-type layers appearing within ingot 41 have substantially the same impurity activator content. Likewise, the various N-type regions within ingot 41 have substantially the same impurity activator concentrations. As a result of the above, it is possible to produce, from a single rate grown ingot, many thousands of N-P-N transistors, all of which have very nearly the same electrical properties and are interchangeable as components in electronic circuits. Contributing to this uniformity is the fact that, as may be seen from Figs. 4 and 5, the acceptor impurity segregation coefficient, and hence the total segregation of acceptor activator impurities, is substantially independent of growth rate. Hence, the acceptor activator impurity concentration is substantially uniform throughout transistor 56.

Further advantages of transistor 56 over other junction transistors arise from the rate growing thereof. As may be seen from Fig. 7(*b*), the concentration of uncompensated activator impurities (which determine the electrical characteristics of transistor 56) varies continually along bar 42. At the junctions between P-type and N-type regions, there are no uncompensated impurities and the junction is composed of substantially intrinsic semiconductor. Within the P-type region, there is a moderate excess of uncompensated acceptor impurities represented by the slight excursion of the curve of 7(*b*) below the intrinsic semiconductor line. In the N-type regions, on the other hand, the concentration of uncompensated donor activator impurities is quite high and as a practical matter the average uncompensated activator impurity concentration of the N-type regions of rate grown transistor 56 is always greater than 10 times the maximum uncompensated acceptor impurity activator concentration within P-type region 50 of transistor 56. This condition results in the emitter and collector regions 59 and 62 of rate grown transistor 56 having average resistivities less than 1/10 the resistivity of base region 50 of the transistor. It is well known in transistor electronics that this condition is desirable, particularly with respect to the collector region. One problem in transistor construction is to keep the number of minority carriers (in the case of an N-type region: positive holes) in the collector region as low as possible to prevent the current amplification factor of the transistor ($\alpha$) from exceeding one and causing instability.

By increasing the concentration of uncompensated donor activator impurities in the collector of transistor 56, the probability of instability of operation is drastically reduced. Thus, rate grown transistor 56 possesses decided advantages over other types of junction transistors which usually have a lower concentration of uncompensated activator impurities in the collector than in the base.

A further advantage of rate grown transistor 56 over other junction transistors follows from the heavy preponderance of N-type carriers in collector 62. As mentioned hereinbefore, the gradient of uncompensated activator impurities across a collector junction should be gradual. But on the other hand, the eventual uncompensated donor activator impurity concentration within the collector should be high. In making transistors by previously known methods, both of the above aims had to be compromised somewhat as, in previously known methods of transistor fabrication, the two aims were inconsistent. With the variation of uncompensated activator impurity concentration as shown in Fig. 7(*b*), achieved by the growth rate cycle shown in Fig. 6, rate grown transistors serve the two aims.

Although I have described above a particular melt composition and cycle of ingot growth rate variation preferred for the production of N-P-N junction units destined for use in high frequency transistors, it will be appreciated that other easily determined melt compositions and growth rate variation cycles can be employed to produce single or multiple P-N junction units destined for other purposes and having almost any desired geometry and combination of electrical characteristics.

Additionally, although I have described my invention principally in connection with the donor impurity antimony and the acceptor impurity gallium, it will be appreciated that other donor impurities, such as arsenic, may be substituted for antimony, and other acceptor impurities, such as indium, may be substituted for gallium. The only requirements are, firstly, that the donor and acceptor impurity combination selected be one in which the donor impurity and acceptor impurities show different incremental changes in segregation constant with growth rate variations relative to the semiconductor involved and, secondly, that the selected donor and acceptor impurites be included in melt 39 in proper ratio so as to be effective equivalent amounts and to have an intrinsic semiconductor-producing growth rate somewhere between the zero growth rate and the rate at which nucleation of the melt begins.

Since many modifications of the invention can, of course, be made, it is to be understood that I intend to cover, by the appended claims, all such modifications as fall within the true spirit and scope of the invention.

What I claim as new and desire to secure by Letters Patent of the United States is:

1. The method of making semiconductor P–N junction bodies, which method comprises preparing a melt consisting of a high purity semiconductor, a trace of a donor activator impurity for the semiconductor and a trace of an acceptor activator impurity for the semiconductor, the impurity traces being included in the melt in effective equivalent amounts sufficient to provide intrinsic-type semiconductor in a semiconductor crystal grown from the melt at a constant growth rate and each having a different rate of segregation coefficient variation relative to the semiconductor over a range of crystal growth rate variation encompassing said constant growth rate, and growing a semiconductor crystal from the melt at growth rates continuously and cyclically varying above and below said constant growth rate.

2. The method of making P–N junctions in semiconductors, which method comprises preparing a melt consisting of high purity semiconductor selected from the group consisting of silicon and germanium, adding to said melt a donor activator impurity and an acceptor activator impurity for the semiconductor which have different incremental rates of increase in the percentage of their assimilation within an ingot grown from a semiconductor melt containing the impurity as the ingot growth rate increases from zero to 20 inches per hour, said donor and acceptor impurites being added to the semiconductor melt in amounts providing substantially an electrical balance between the negative and positive conduction carriers induced by the respective donor and acceptor impurities assimilated by an ingot grown at a constant growth rate less than 20 inches per hour, and growing a monocrystalline ingot from said donor and acceptor impurity impregnated melt at growth rates continuously and cyclically varying through said constant growth rate.

3. The method of making P–N junction units in a semiconductor ingot, which method comprises preparing a melt of high purity semiconductor selected from the group consisting of silicon and germanium, adding to said melt a trace of a donor activator impurity for the semiconductor, adding to said melt a trace of an acceptor activator impurity for the semiconductor having over a particular range of growth rate variation a rate of segregation coefficient variation that is different from that of said donor impurity, said acceptor impurity being added in an amount providing substantially an electrical balance between the negative and positive conduction carriers in an ingot grown from said donor and acceptor impurity impregnated melt at a constant growth rate within said range, growing an ingot from said impurity impregnated melt, and continuously and cyclically varying the growth rate of the ingot above and below said constant growth rate to form alternate regions of N-type and P-type semiconductor within the grown ingot.

4. The method of making P–N junctions in a semiconductor, which method comprises preparing a melt consisting of a high purity semiconductor selected from the group consisting of silicon and germanium, a trace of donor activator impurity for the semiconductor and a trace of acceptor activator impurity for the semiconductor, the impurity traces being included in the melt in amounts providing intrinsic-type semiconductor in a crystal grown from the melt at a constant intrinsic growth rate and each having a different rate of segregation coefficient variation over a range of crystal growth rate variation encompassing said intrinsic growth rate, and growing a crystal from the melt at growth rates continuously and cyclically varying through said intrinsic growth rate with a rate of change of growth velocity between 0.05 and 1 inch per minute per minute.

5. The method of making P–N junctions in a semiconductor ingot, which method comprises preparing a melt consisting of a high purity semiconductor selected from the group consisting of germanium and silicon, a donor activator impurity for the semiconductor, and an acceptor activator impurity for the semiconductor, said donor and acceptor impurities being present in effective equivalent amounts sufficient to provide intrinsic-type semiconductor in an ingot grown from said melt at a preselected intrinsic growth rate between zero and 20 inches per hour, said donor and acceptor impurities having different incremental rates of change in their segregation coefficients within said range of growth rates, growing a monocrystalline semiconductor ingot from said melt and producing alternate regions of P-type semiconductor and N-type semiconductor in the grown ingot by continuously and cyclically varying the growth rate of the growing ingot through said intrinsic growth rate.

6. The method of making P-N junctions in germanium, which method comprises preparing a melt consisting of high purity germanium, antimony and gallium in which the weight ratio of antimony to gallium is from 20 to 60 parts antimony per 1 part gallium and the total antimony-gallium content in the melt is from 1 to 100 milligrams antimony-gallium for each 100 grams of germanium, growing a germanium monocrystalline ingot from said melt, and producing alternate P-type and N-type regions within the growing ingot by continuously and cyclically varying the growth rate of the growing ingot between a rate at which P-type germanium is formed and a rate at which N-type germanium is formed therein.

7. The method of making P-N junctions in germanium, which method comprises preparing a melt consisting of high purity germanium, antimony and indium in which the weight ratio of antimony to indium is 1 part antimony to from 2.5 to 7.5 parts indium and the total antimony-indium content in the melt is from 5 to 250 milligrams antimony-indium for each 100 grams germanium, growing a germanium monocrystalline ingot from the melt, and producing alternate P-type and N-type regions within the growing ingot by continuously and cyclically varying the growth rate thereof between a rate at which P-type germanium is formed and a rate at which N-type germanium is formed in the grown ingot.

8. The method of making P-N junctions in silicon, which method comprises preparing a melt consisting of silicon, aluminum and antimony in which the weight ratio of aluminum to antimony is from 2.5 to 3.5 parts aluminum per 1 part antimony and the total aluminum-antimony content in the melt is from 0.1 to 10 milligrams aluminum-antimony for each 10 grams of silicon, growing a silicon monocrystalline ingot from said melt, and producing alternate P-type and N-type regions within the growing ingot by continuously and cyclically varying the growth rate of the growing ingot between a rate at which P-type silicon is formed and a rate at which N-type silicon is formed therein.

9. The method of making P-N junctions in silicon, which method comprises preparing a melt consisting of silicon, aluminum and antimony in which the weight ratio of aluminum to antimony is approximately 2.5 parts aluminum to 1 part antimony and the total aluminum-antimony content in the melt is about 4 milligrams aluminum-antimony for each 10 grams of silicon, growing a silicon monocrystalline ingot by seed crystal withdrawal from said melt, rotating the growing ingot at a rate above 20 revolutions per minute to stir the melt at the growing interface, and forming alternate regions of P-type silicon and N-type silicon within the growing ingot by continuously and cyclically varying the growth rate thereof between a rate at which P-type silicon is formed and a rate at which N-type silicon is formed in the grown ingot.

10. The method of making P-N junctions in germanium, which method comprises preparing a melt consisting of high purity germanium, antimony and gallium in which the weight ratio of antimony to gallium is from 20 to 60 parts antimony per 1 part gallium and the total antimony-gallium content in the melt is from 1 to 100 milligrams antimony-gallium for each 100 grams of germanium, growing a germanium monocrystalline ingot by seed crystal withdrawal from said melt, rotating the growing ingot at a rate above 20 revolutions per minute to stir the melt at the growing interface, and forming alternate regions of P-type germanium and N-type germanium within the growing ingot by continuously and cyclically varying the growth rate thereof between a rate at which P-type germanium is formed and a rate at which N-type germanium is formed in the grown ingot.

11. The method of making P-N junctions in germanium, which method comprises preparing a melt consisting of high purity germanium, antimony and indium in which the weight ratio of antimony to indium is 1 part antimony to from 2.5 to 7.5 parts indium and the total antimony-indium content of the melt is from 5 to 250 milligrams antimony-indium for each 100 grams of germanium, growing a germanium monocrystalline ingot by seed crystal withdrawal from said melt, rotating the growing ingot at a rate above 20 revolutions per minute to stir the melt at the growing interface, and forming alternate regions of P-type germanium and N-type germanium within the growing ingot by continuously and cyclically varying the growth rate thereof between a rate at which P-type germanium is formed and a rate at which N-type germanium is formed in the grown ingot.

12. The method of making, in a semiconductor, P-N junction units having a steep conduction carrier concentration gradient across the junction, which method comprises placing in a crucible a quantity of a high purity semiconductor selected from the group consisting of germanium and silicon, a trace of a donor activator impurity for the semiconductor and a trace of acceptor activator impurity for the semiconductor, the impurity traces being supplied in effective equivalent amounts sufficient to provide intrinsic-type semiconductor in a crystal grown from a melt thereof at a preselected constant intrinsic growth rate and each having a different rate of segregation coefficient variation over a range of crystal growth rate variation encompassing said intrinsic growth rate, supplying sufficient electrical input power to said crucible to form a molten melt of the semiconductor and donor and acceptor impurities, growing a monocrystalline ingot from said melt by seed crystal withdrawal at a growth rate above said intrinsic growth rate to provide a region of one conductivity-type semiconductor therein, raising the power input to the melt to cause the growth rate to fall below said intrinsic growth rate to provide a region of opposite conductivity-type semiconductor therein, maintaining said raised input power to the melt until the ingot is melted back through the last grown region of opposite conductivity-type semiconductor into the previously grown one conductivity-type semiconductor region, and then reducing the power input to the melt thereby causing the ingot to begin growing again at a growth rate below the preselected intrinsic growth rate forming therein a region of opposite conductivity-type semiconductor immediately adjacent the one conductivity-type semiconductor into which the ingot is melted back.

13. The method of making in germanium P-N junction units having a steep conduction carrier concentration gradient across the junction, which method comprises placing in a crucible a quantity of high purity germanium and traces of antimony and indium in which the weight ratio of antimony to indium is 1 part antimony to from 2.5 to 7.5 parts indium and the total antimony-indium content is from 5 to 250 milligrams antimony-indium per 100 grams of germanium, supplying sufficient electrical input power to said crucible to form a molten melt of germanium, antimony and indium, growing a monocrystalline ingot from said melt by seed crystal withdrawal at a growth rate above a preselected value at which intrinsic germanium is formed to provide a region of N-type germanium in the growing ingot, raising the power input to the melt to cause the growth rate to fall below said intrinsic growth rate to provide a region of P-type germanium in the ingot, maintaining said raised input power to the melt until the ingot is melted back through the last grown P-type region and into the previously grown N-type region, and then reducing the power input to the melt to cause the ingot to begin growing again at a growth rate below the preselected intrinsic growth rate thereby producing a P-type germanium region in the grown ingot immediately adjacent the N-type region into which the ingot is melted back.

14. The method of making in germanium P-N junction units having a steep conduction concentration carrier gradient across the junction, which method comprises placing in a crucible a quantity of high purity germanium, and traces of antimony and gallium in which the weight ratio of antimony to gallium is from 20 to 6 parts antimony to 1 part gallium and the total antimony-gallium content is from 1 to 100 milligrams antimony-gallium per 100 grams of germanium, supplying sufficient electrical input power to said crucible to form a molten melt of germanium, antimony and gallium, growing a monocrystalline ingot from said melt by seed crystal withdrawal at a growth rate above a preselected value at which intrinsic germanium is formed to provide a region of N-type germanium in the growing ingot, raising the power input to the melt to first cause the growth rate to fall below said intrinsic growth rate to provide a region of P-type germanium in the ingot, maintaining said raised input power to the melt until the ingot is melted back through the last-grown P-type region and into the previously grown N-type region, and then reducing the power input to the melt thereby causing the ingot to begin growing again at a growth rate below the preselected intrinsic growth rate thereby producing a P-type germanium region in the grown ingot immediately adjacent the N-type region into which the ingot is melted back.

15. The method of making in silicon P-N junction units having a steep conduction carrier concentration gradient across the junction, which method comprises placing in a crucible a quantity of high purity silicon and traces of aluminum and antimony in which the weight ratio of aluminum to antimony is from 2.5 to 3.5 parts aluminum to 1 part antimony and the total aluminum-antimony content is approximately 4 milligrams aluminum-antimony for each 10 grams of silicon, supplying sufficient electrical power to said crucible to form a molten melt of silicon, aluminum, and antimony, growing a monocrystalline silicon ingot from said melt by seed crystal withdrawal therefrom at a growth rate above a preselected value at which intrinsic silicon is formed to provide a region of N-type silicon in the growing ingot, raising the power input to the melt to cause the growth rate of the ingot to fall below said intrinsic growth rate to provide a region of P-type silicon in the growing ingot, maintaining said raised power inout to the melt until the ingot is melted back through the last grown P-type region and into the previously grown N-type region and then reducing the power input to the melt to cause the ingot to begin growing again at a growth rate below the preselected intrinsic growth rate thereby producing a P-type silicon region in the grown ingot immediately adjacent the N-type region into which the ingot is melted back.

16. The method of making N-P-N junction units suitable for use in high frequency transistors, which method comprises placing in a crucible a quantity of high purity germanium and traces of antimony and gallium in which the weight ratio of antimony to gallium is approximately 50 parts antimony to 1 part gallium, and the total antimony-gallium content is from 1 to 20 milligrams antimony-gallium per 100 grams germanium, supplying electrical input power to said crucible to form a molten melt of germanium, antimony, and gallium, growing a monocrystalline germanium ingot from said melt, adjusting the power input to the melt to provide an ingot growth rate producing an N-type germanium region in the grown ingot, raising the power input to the melt until the ingot stops growing and melts back into said N-type germanium region, and then rapidly lowering the power input to the melt to accelerate the growth rate from zero, through a growth rate range at which a thin region of P-type germanium is formed in the grown ingot, and to said N-type producing growth rate with a rate of change of growth velocity of the order of 0.5 inch per minute per minute.

17. The method of making N-P-N junction units suitable for use in high frequency transistors, which method comprises placing in a crucible a quantity of high purity germanium, and traces of antimony and indium in which the weight ratio of antimony to indium is 1 part antimony to about 3 parts indium and the total antimony-indium content is from 10 to 100 milligrams antimony-indium per 100 grams of germanium, supplying electrical input power to said crucible to form a molten melt of germanium, antimony, and indium, growing a monocrystalline germanium ingot from said melt by seed crystal withdrawal, adjusting the power input to the melt to provide an ingot growth rate producing an N-type germanium region in the grown ingot, raising the power input to the melt until the ingot stops growing and melts back into said N-type germanium region, and then rapidly lowering the power input to the melt to accelerate the growth rate from zero, through a growth rate range at which a thin region of P-type germanium is formed in the grown ingot, and to said N-type producing growth rate with a rate of change of growth velocity of the order of 0.5 inch per minute per minute.

18. The method of making multiple junction semiconductor units suitable for use in transistors which method comprises placing in a crucible a quantity of high purity semiconductor selected from the group consisting of germanium and silicon, together with a trace of a donor activator impurity for the semiconductor and a trace of an acceptor activator impurity for the semiconductor, the impurity traces being supplied in effective equivalent amounts sufficient to provide intrinsic type semiconductor in a crystal grown from a melt thereof at a pre-selected constant intrinsic growth rate and each having a different rate of segregation coefficient variation over a range of crystal growth rate variation encompassing said intrinsic growth rate, supplying sufficient electrical input power to said crucible to form a molten melt of the semiconductor and donor and acceptor impurities, growing a monocrystalline semiconductor ingot from said melt by seed crystal withdrawal, and continuously and cyclically raising and lowering the power input to said melt to vary successively the crystal growth rate above and below said intrinsic growth rate thereby to produce along the length of the grown crystal alternate regions of opposite conductivity type, the power input to the melt during the high power portion of the power cycle being raised to an extent sufficient to melt the crystal back into the portion of the crystal grown during the low power portion of the power cycle.

19. The method of making N-P-N junction units, which method comprises placing in a crucible a quantity of high purity silicon and traces of aluminum and antimony in which the weight ratio of aluminum to antimony is from 2.5 to 3.5 parts aluminum to 1 part antimony and the total aluminum-antimony content is about 4 milligrams aluminum-antimony for each 10 grams of silicon, supplying sufficient electrical input power to said crucible to form a molten melt of silicon, aluminum and antimony, growing a silicon monocrystalline ingot from the melt by seed crystal withdrawal and continuously and cyclically raising and lowering the power input to the melt while the ingot is being grown, the power input to the melt being lowered during each low power portion of the power cycle to an extent sufficient to produce an N-type region in the growing ingot and being raised during each high power portion of the power cycle to an extent sufficient to melt the ingot back into the N-type region grown during the previous low power portion of the power cycle.

20. The method of making N-P-N junction units, which method comprises placing in a crucible a quantity of high purity germanium, and traces of antimony and gallium, in which the weight ratio of antimony to gallium is from 20 to 60 parts antimony to 1 part gallium and the total antimony-gallium content is from 1 to 100 milligrams antimony-gallium for each 100 grams of germanium, supplying electrical input power to said crucible to form a molten melt of germanium, antimony, and gallium, growing a germanium monocrystalline ingot from the melt by seed crystal withdrawal and continuously and cyclically raising and lowering the power input to the melt while the ingot is being grown, said power input being lowered during the low power portion of each power cycle to an extent sufficient to produce an N-type region in the growing ingot and being raised during the high power portion of each power cycle to an extent sufficient to melt the ingot back into the N-type region grown during the previous low power portion of the cycle.

21. The method of making N-P-N junction units which method comprises, placing in a crucible a quantity of high purity germanium, and traces of indium and antimony in which the weight ratio of indium to antimony is from 2.5 to 7.5 parts indium to one part antimony and the total indium-antimony content is from 5 to 250 milligrams indium-antimony for each 100 grams of germanium, supplying electrical input power to said crucible to form a molten melt of germanium, antimony, and gallium, growing a germanium monocrystalline ingot from the melt by seed crystal withdrawal and continuously and cyclically raising and lowering the power input to the melt while the ingot is being grown, said power input being lowered during the low power portion of each power cycle to an extent sufficient to produce an N-type region in the growing ingot and being raised during the high power portion of each power cycle to an extent sufficient to melt the ingot back into the N-type region grown during the previous low power portion of the cycle.

22. The method of making N-P-N junction units suitable for use in high frequency transistors, which method comprises placing in a crucible a quantity of high purity germanium and traces of antimony and gallium in which the weight ratio of antimony to gallium is about 50 parts antimony per 1 part gallium and the total antimony-gallium content is from 1 to 20 milligrams antimony-gallium per 100 grams of germanium, supplying sufficient electrical input power to the crucible to form a molten melt of germanium, antimony and gallium, growing a monocrystalline ingot from said melt by seed crystal withdrawal, rotating the ingot about its longitudinal axis at a velocity above 20 revolutions per minute while it is being grown, continuously and cyclically raising and lowering the power input to the melt while the ingot is being grown, said melt power input being lowered during the low power portion of each power cycle to an extent sufficient to produce an N-type region in the growing ingot and being raised during the high power portion of each power cycle to an extent sufficient to melt the ingot back into the previously formed N-type region, and extracting from the grown ingot small bars each containing two N-type regions separated by a P-type region.

23. A semiconductor body from which P-N junction units may be extracted said body comprising a monocrystalline semiconductor ingot having along its length a plurality of N-type regions and a plurality of intermediate P-type regions and characterized in that all of said P-type regions have substantially the same total impurity concentrations and that all of said N-type regions have substantially the same total impurity concentrations.

24. A semiconductor body from which N-P-N junction transistors may be extracted said body comprising a monocrystalline semiconductor ingot having along its length a plurality of N-type regions and a plurality of intermediate P-type regions, each of said P-type regions being less than 0.001 inch thick.

25. A semiconductor body from which P-N junction units may be extracted and comprising a monocrystalline semiconductor ingot having along its length a plurality of N-type regions and a plurality of intermediate P-type regions having a thickness of less than 0.001 inch and characterized in that the acceptor impurity concentration is substantially constant along the entire length of said body, and that all of said P-type regions have substantially the same total impurity concentration and that all of said N-type regions have substantially the same total impurity concentration.

26. An N-P-N junction unit comprising a monocrystalline semiconductor body having two non-contiguous zones possessing N-type conductivity characteristics and an intermediate zone less than 0.001 inch thick possessing P-type conductivity characteristics and forming P-N junctions with said N-type zones, said unit characterized in that the total acceptor impurity concentration is substantially uniform throughout said zones.

27. An N-P-N junction unit comprising a monocrystalline semiconductor body having a first zone having therein an excess of uncompensated donor activator impurities causing said zone to exhibit N-type conductivity characteristics, a second zone less than 0.001 inch thick having therein an excess of uncompensated acceptor activator impurities causing said zone to exhibit P-type conductivity characteristics, and a third zone having therein an excess of uncompensated donor activator impurities causing said zone to exhibit N-type conductivity characteristics, the concentration of uncompensated donor activator impurities in said first and third zones being at least ten times greater than the concentration of uncompensated acceptor impurities in said second zone.

28. An N-P-N junction transistor comprising a monocrystalline semiconductor body having a first N-type zone constituting an emitter, a P-type zone less than 0.001 inch thick constituting a base contiguous with said emitter and forming a substantially planar emitter junction therewith, a second N-type region constituting a collector contiguous with said base and forming a substantially planar collector junction therewith, the resistivity of said base being at least ten times greater than the resistivities of said emitter and said collector.

29. An N-P-N junction transistor comprising a monocrystalline semiconductor body having a first zone having therein an excess of uncompensated donor activator impurities causing said zone to exhibit N-type conductivity characteristics, a second zone less than 0.001 inch thick having therein an excess of uncompensated acceptor activator impurities causing said zone to exhibit P-type conductivity characteristics and forming with said first zone an emitter P-N junction, and a third zone having therein an excess of uncompensated donor activator impurities causing said zone to exhibit N-type conductivity characteristics and forming, with said second zone, a collector P-N junction, said collector junction having a gradient of uncompensated activator impurities of less than $3 \times 10^{18}$ per cubic centimeter per centimeter thereacross, and the excess of uncompensated donor activator impurities within said third zone rises to a value greater than $2 \times 10^{15}$ per cubic centimeter within 0.01 centimeter from said collector junction.

References Cited in the file of this patent

UNITED STATES PATENTS

| | | |
|---|---|---|
| 2,631,356 | Sparks et al. | Mar. 17, 1953 |
| 2,694,024 | Bond et al. | Nov. 9, 1954 |
| 2,703,296 | Teal | Mar. 1, 1955 |
| 2,739,088 | Pfann | Mar. 20, 1956 |
| 2,768,914 | Buehler | Oct. 30, 1956 |